(12) United States Patent
Narayanaswamy et al.

(10) Patent No.: US 10,513,661 B2
(45) Date of Patent: Dec. 24, 2019

(54) INTEGRATED PROCESS CONFIGURATION INVOLVING THE STEPS OF PYROLYSIS, HYDROCRACKING, HYDRODEALKYLATION AND STEAM CRACKING

(71) Applicant: SABIC Global Technologies B.V., Bergen op Zoom (NL)

(72) Inventors: Ravichander Narayanaswamy, Bangalore (IN); Krishna Kumar Ramamurthy, Bangalore (IN); Abrar A. Hakeem, Sittard (NL); Lara Galan-Sanchez, Elsloo (NL); Nicolas Goyheneix, Elsloo (NL); Santosh Ganji, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/323,191

(22) PCT Filed: Sep. 21, 2017

(86) PCT No.: PCT/IB2017/055742
§ 371 (c)(1),
(2) Date: Feb. 4, 2019

(87) PCT Pub. No.: WO2018/055555
PCT Pub. Date: Mar. 29, 2018

(65) Prior Publication Data
US 2019/0161683 A1 May 30, 2019

Related U.S. Application Data

(60) Provisional application No. 62/398,328, filed on Sep. 22, 2016.

(51) Int. Cl.
*C10G 1/10* (2006.01)
*C10G 1/06* (2006.01)
(Continued)

(52) U.S. Cl.
CPC ............... *C10G 1/10* (2013.01); *B01D 3/143* (2013.01); *B01D 53/40* (2013.01); *B01D 53/78* (2013.01);
(Continued)

(58) Field of Classification Search
CPC .... C10G 1/10; C10G 1/06; C07C 4/02; C07C 4/12; C07C 4/14
(Continued)

(56) References Cited

U.S. PATENT DOCUMENTS 3,400,168 A  9/1968 Fukuda et al. ............... 260/672
4,022,681 A  5/1977 Sheng et al. ................... 208/57
(Continued)

FOREIGN PATENT DOCUMENTS

CN  103980938 A  8/2014
EP  0726306 A1  8/1996
(Continued)

OTHER PUBLICATIONS

International Search Report and Written Opinion from PCT/IB2017/055742, dated Dec. 12, 2017, 11 pages.
(Continued)

*Primary Examiner* — Thuan D Dang
(74) *Attorney, Agent, or Firm* — Norton Rose Fulbright US LLP

(57) ABSTRACT

A process for processing plastic waste comprising converting plastic waste to hydrocarbon liquid and a first $C_{1-4}$ gas; contacting hydrocarbon liquid with a first hydroprocessing catalyst in hydroprocessing unit to yield a second $C_{1-4}$ gas and a first hydrocarbon product comprising $C_5+$ liquid
(Continued)

hydrocarbons; introducing the first hydrocarbon product to a first separating unit to produce treated hydrocarbon stream comprising $C_{5-8}$ hydrocarbons and a first heavies stream comprising C9+ hydrocarbons; contacting the first heavies stream with a second hydroprocessing catalyst in hydrodealkylating unit to yield a second hydrocarbon product comprising $C_5$+ liquid hydrocarbons and a third $C_{1-4}$ gas; conveying the second hydrocarbon product to the first separating unit; feeding treated hydrocarbon stream to steam cracker to produce steam cracker product; separating steam cracker product into olefin gas, saturated hydrocarbons gas, aromatics, and a second heavies stream; and conveying the second heavies stream to hydroprocessing unit.

18 Claims, 23 Drawing Sheets

(51) Int. Cl.
| | |
|---|---|
| C07C 4/02 | (2006.01) |
| C07C 4/12 | (2006.01) |
| C07C 4/14 | (2006.01) |
| B01D 3/14 | (2006.01) |
| B01D 53/40 | (2006.01) |
| B01D 53/78 | (2006.01) |
| C10B 47/24 | (2006.01) |
| C10B 53/07 | (2006.01) |
| C10B 57/06 | (2006.01) |
| C10G 69/14 | (2006.01) |

(52) U.S. Cl.
CPC .............. *C10B 47/24* (2013.01); *C10B 53/07* (2013.01); *C10B 57/06* (2013.01); *C10G 1/06* (2013.01); *C10G 69/14* (2013.01); *B01D 2258/0283* (2013.01); *C10G 2400/20* (2013.01); *C10G 2400/30* (2013.01)

(58) Field of Classification Search
USPC ........ 585/324, 319, 310, 652, 648, 488, 489
See application file for complete search history.

(56) References Cited

U.S. PATENT DOCUMENTS

| | | | |
|---|---|---|---|
| 4,150,061 | A | 4/1979 | Feinstein et al. ......... 260/672 T |
| 8,142,645 | B2 | 3/2012 | Zhou et al. ................... 208/112 |
| 8,895,790 | B2 | 11/2014 | Narayanaswamy et al. ................ 585/241 |
| 9,061,953 | B2 | 6/2015 | Johnson et al. |
| 9,193,921 | B2 | 11/2015 | Frey et al. |
| 2014/0228606 | A1 | 8/2014 | Narayanaswamy et al. ................ 585/241 |
| 2016/0264874 | A1 | 9/2016 | Narayanaswamy et al. |
| 2016/0264885 | A1 | 9/2016 | Narayanaswamy et al. |

FOREIGN PATENT DOCUMENTS

| | | |
|---|---|---|
| SG | 190307 | 6/2013 |
| WO | WO2015128033 A1 | 9/2015 |
| WO | WO2016009333 A1 | 1/2016 |

OTHER PUBLICATIONS

Shah et al. "Conversion of Waste Plastic to Oil: Direct Liquefaction versus Pyrolysis and Hydroprocessing." *Energy Fuels*, 1999, 13 (4), 832-838.
Shiraga et al. "Boiling-Point Distributions and Dechlorination of Organic Chlorine Compounds in Oil Obtained from the Degradation of PVC Mixed Plastic." *Energy Fuels*, 1999, 13 (2), 428-432.
U.S. Appl. No. 62/201,655, filed Aug. 6, 2015.
U.S. Appl. No. 62/201,657, filed Aug. 6, 2015.
U.S. Appl. No. 62/201,669, filed Aug. 6, 2015.
U.S. Appl. No. 62/201,676, filed Aug. 6, 2015.
U.S. Appl. No. 62/025,762, filed Jul. 17, 2014.
U.S. Appl. No. 62/361,639, filed Jul. 13, 2016.
U.S. Appl. No. 62/369,379, filed Aug. 1, 2016.
U.S. Appl. No. 62/406,722, filed Oct. 11, 2016.

*Figure 2*

| Carbon No. | n-Paraffins, wt.% | i-Paraffins, wt.% | Olefins, wt.% | Naphthenes, wt.% | Aromatics, wt.% | Total, wt.% |
|---|---|---|---|---|---|---|
| 2 | | | | | | |
| 3 | | | | | | |
| 4 | | 0.015 | | | | 0.015 |
| 5 | 0.012 | | | | | 0.012 |
| 6 | 0.016 | 0.18 | | 27.136 | 0.048 | 27.217 |
| 7 | | | | | | 0 |
| 8 | 0.145 | 14.226 | | 0.547 | 21.979 | 36.896 |
| 9 | | 0.079 | | 5.901 | 0.834 | 6.814 |
| 10 | 26.01 | 2.93 | | | | 0.039 |
| 11 | | | | | | |
| 12 | | | | | | |
| Total, wt.% | 26.221 | 17.268 | | 35.584 | 22.86 | 99.933 |
| Unknown | | | | | | 0.053 |
| Heavies | | | | | | 0.013 |

*Figure 3A*

| Example 2A Liquid Product 60 barg | | Example 2B Liquid Product 20 barg | | Example 2C Liquid Product 10 barg | |
|---|---|---|---|---|---|
| Cut, wt.% | T, °C | Cut, wt.% | T, °C | Cut, wt.% | T, °C |
| 0 | 61.4 | 0 | 52.0 | 0 | 61.4 |
| 5 | 72.0 | 5 | 61.4 | 5 | 72.0 |
| 10 | 72.0 | 10 | 72.0 | 10 | 72.0 |
| 15 | 72.0 | 15 | 72.0 | 15 | 72.0 |
| 20 | 72.0 | 20 | 72.0 | 20 | 72.0 |
| 25 | 72.0 | 25 | 72.0 | 25 | 72.0 |
| 30 | 87.6 | 30 | 72.0 | 30 | 72.0 |
| 35 | 87.6 | 35 | 72.0 | 35 | 87.6 |
| 40 | 87.6 | 40 | 87.6 | 40 | 87.6 |
| 45 | 87.6 | 45 | 87.6 | 45 | 132.0 |
| 50 | 87.6 | 50 | 134.6 | 50 | 137.2 |
| 55 | 129.4 | 55 | 137.2 | 55 | 139.8 |
| 60 | 134.6 | 60 | 139.8 | 60 | 139.8 |
| 65 | 139.8 | 65 | 142.4 | 65 | 161.2 |
| 70 | 170.6 | 70 | 163.2 | 70 | 173.8 |
| 75 | 176.0 | 75 | 175.4 | 75 | 177.0 |
| 79 | 177.6 | 80 | 179.0 | 78 | 178.0 |
| 80 | 278.6 | 83 | 180.6 | 80 | 271.6 |
| 85 | 289.2 | 85 | 279.6 | 85 | 288.2 |
| 90 | 292.0 | 90 | 291.0 | 90 | 291.6 |
| 95 | 294.0 | 95 | 294.6 | 95 | 294.0 |
| 99 | 295.4 | 99 | 296.8 | 99 | 295.4 |
| 100 | 295.6 | 100 | 297.0 | 100 | 295.6 |

*Figure 3B*

| Example No. | n-Paraffins, wt.% | i-Paraffins, wt.% | Olefins, wt.% | Naphthenes, wt.% | Aromatics, wt.% | Unknown, wt.% | Heavies, wt.% |
|---|---|---|---|---|---|---|---|
| 2A | 22.507 | 19.415 | 0.183 | 31.159 | 17.912 | 0.131 | 0.693 |
| 2B | 19.544 | 21.513 | 0.047 | 30.490 | 27.465 | 0.315 | 0.626 |
| 2C | 21.368 | 21.281 | 0.000 | 24.687 | 30.719 | 0.355 | 1.591 |

*Figure 4A*

| T, °C | P, barg | WHSV, hr$^{-1}$ | H$_2$/HC, NL/L | Cl, ppm in liquid product |
|---|---|---|---|---|
| 300 | 60 | 0.92 | 414 | 0.32 |
| 300 | 40 | 0.92 | 414 | 0.87 |
| 350 | 40 | 0.92 | 414 | 3.42 |
| 400 | 40 | 0.92 | 414 | 3.15 |

*Figure 4B*

| T, °C | P, barg | WHSV, hr$^{-1}$ | H$_2$/HC, NL/L | Cl, ppm in liquid product | H$_2$, mole % | CH$_4$, mole % | C$_2$H$_6$, mole % | C$_3$H$_8$, mole % | n-C$_4$H$_{10}$, mole% | i-C$_4$H$_{10}$, mole% |
|---|---|---|---|---|---|---|---|---|---|---|
| 300 | 40 | 0.92 | 414 | 0.87 | 96.63 | 3.25 | 0.12 | - | - | - |
| 350 | 40 | 0.92 | 414 | 3.42 | 95.32 | 4.48 | 0.2 | - | - | - |
| 400 | 40 | 0.92 | 414 | 3.15 | 93.96 | 5.21 | 0.45 | 0.23 | 0.08 | 0.07 |

*Figure 5A*

| Material | Amount, wt.% |
|---|---|
| HDPE | 19 |
| LDPE | 21 |
| PP | 24 |
| C$_4$-LLDPE | 12 |
| C$_6$-LLDPE | 6 |
| PS | 11 |
| PET | 7 |

*Figure 5B*

| Carbon No. | n-Paraffins, wt.% | i-Paraffins, wt.% | Olefins, wt.% | Naphthenes, wt.% | Aromatics, wt.% | Total, wt.% |
|---|---|---|---|---|---|---|
| 5 | 0.013 | 0.02 | 0.169 | 0.031 | | 0.233 |
| 6 | 0.101 | 0.219 | 1.031 | 0.318 | 5.28 | 9.113 |
| 7 | 0.254 | 1.243 | 2.267 | 0.665 | 17.188 | 21.618 |
| 8 | 0.544 | 2.703 | 0.354 | 1.125 | 30.339 | 35.066 |
| 9 | 0.22 | 3.98 | 0.107 | 1.44 | 10.95 | 16.70 |
| 10 | 0.12 | 2.07 | | 0.217 | 3.89 | 6.30 |
| 11 | 0.10 | 2.53 | | 0.299 | 1.53 | 4.39 |
| 12 | 0.05 | 0.46 | | | 3.37 | 3.88 |
| 13 | 0.03 | | | | | 0.03 |
| Unknown | | | | | | 2.69 |
| Total, wt.% | 1.42 | 13.22 | 3.928 | 4.03 | 74.72 | 97.32 |
| Total, wt.% on Aromatics-Free Basis | 6.3 | 58.5 | 17.4 | 17.8 | | |

*Figure 6A*

|  | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| Feed Weight Transferred, g | 1.50 | 1.50 | 1.50 | 1.50 | 1.50 | 1.50 |
| Bone-Dry Catalyst Feed, g | 9.05 | 8.95 | 9.05 | 9.05 | 9.01 | 8.95 |
| C/F ratio, g/g | 6.03 | 6.0 | 6.03 | 6.03 | 6.00 | 6.0 |
| Reaction Start Temperature, °C | 600 | 600 | 635 | 635 | 670 | 670 |
| 1 min Avg. Reactor Bed Temperature, °C | 482 | 472 | 525 | 525 | 567 | 570 |
| Yield, wt.%, based on $H_2$-free product |  |  |  |  |  |  |
| Methane | 0.92 | 0.40 | 1.00 | 0.56 | 3.20 | 0.99 |
| Ethane | 0.87 | 0.43 | 0.73 | 0.52 | 0.69 | 0.74 |
| Ethylene | 6.17 | 3.68 | 6.50 | 5.07 | 6.36 | 5.78 |
| Carbon Dioxide | 1.29 | 1.63 | 1.54 | 1.93 | 1.85 | 1.91 |
| Propane | 3.90 | 4.26 | 3.15 | 3.58 | 3.11 | 3.49 |
| Propylene | 12.76 | 11.05 | 13.63 | 12.93 | 14.67 | 14.75 |
| i-Butane | 4.56 | 4.99 | 3.85 | 4.75 | 3.77 | 3.53 |
| n-Butane | 2.67 | 1.84 | 2.07 | 1.57 | 1.31 | 1.41 |
| t-2-Butene | 3.16 | 2.67 | 3.10 | 2.89 | 2.99 | 3.01 |
| 1-Butene | 1.75 | 1.63 | 1.79 | 1.79 | 1.90 | 2.01 |
| i-Butylene | 4.68 | 4.55 | 4.56 | 4.76 | 4.72 | 4.97 |
| c-2-Butene | 2.22 | 1.92 | 2.19 | 2.09 | 2.14 | 2.21 |
| Carbon Monoxide | 1.25 | 0.10 | 0.35 | 0.00 | 0.80 | 0.25 |
| Gasoline | 43.83 | 45.34 | 41.66 | 42.42 | 42.11 | 49.30 |
| Diesel | 5.75 | 9.14 | 7.55 | 8.37 | 4.73 | 5.16 |
| Heavies | 0.56 | 1.64 | 0.78 | 0.88 | 0.49 | 0.86 |
| Coke | 4.67 | 4.73 | 5.55 | 5.88 | 5.12 | 5.64 |

*Figure 6B*

|  | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| $C_1$-$C_4$ Yield, wt.% | 45.2 | 39.1 | 44.5 | 42.5 | 47.5 | 45.0 |
| Liquid Yield, wt.% | 50.1 | 56.1 | 50.0 | 51.7 | 47.3 | 49.3 |
| Coke Yield, wt.% | 4.7 | 4.7 | 5.6 | 5.9 | 5.1 | 5.6 |

*Figure 6C*

|  | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| Total Aromatics Yield Boiling Below 240 °C, wt.% | 32.42 | 31.39 | 32.81 | 31.83 | 35.09 | 32.35 |
| $C_6$-$C_8$ Aromatics Yield, wt.% | 23.81 | 23.20 | 24.44 | 22.63 | 26.33 | 22.87 |
| Total Aromatics/Coke, wt ratio | 6.9 | 6.6 | 5.9 | 5.4 | 6.9 | 5.7 |
| ($C_6$-$C_8$ Aromatics)/Coke, wt ratio | 5.1 | 4.9 | 4.4 | 3.9 | 5.1 | 4.1 |
| Light gas olefins/Coke, wt ratio | 6.6 | 5.4 | 5.7 | 5.0 | 6.4 | 5.8 |

*Figure 6D*

|  | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| $C_4$ Olefins, wt.% | 11.81 | 10.76 | 11.64 | 11.54 | 11.77 | 12.20 |
| $C_3$ Olefins, wt.% | 12.76 | 11.05 | 13.63 | 12.93 | 14.67 | 14.75 |
| $C_2$ Olefins, wt.% | 6.17 | 3.68 | 6.50 | 5.07 | 6.36 | 5.78 |
| Total Olefins, wt.% | 30.74 | 25.49 | 31.77 | 29.54 | 32.80 | 32.72 |

*Figure 6E*

|  | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| Hydrogen Transfer Index (HTI) | 0.87 | 1.00 | 0.67 | 0.77 | 0.56 | 0.57 |
| Isomerization Coefficient | 0.174 | 0.178 | 0.182 | 0.184 | 0.192 | 0.197 |
| $C_2$ Olefin / $C_2$ Saturated Hydrocarbon | 7.1 | 8.6 | 8.9 | 9.8 | 9.2 | 7.9 |
| $C_3$ Olefin / $C_3$ Saturated Hydrocarbon | 3.3 | 2.6 | 4.3 | 3.6 | 4.7 | 4.2 |
| $C_4$ Olefin / $C_4$ Saturated Hydrocarbon | 1.6 | 1.6 | 2.0 | 1.8 | 2.3 | 2.5 |
| % of i-$C_4$ / Total $C_4$ | 23.9 | 28.4 | 21.9 | 26.6 | 22.4 | 20.6 |
| % of Olefins/Total Gases | 68.0 | 65.1 | 71.5 | 69.6 | 69.0 | 72.6 |
| % Olefins / % Saturated Hydrocarbons | 2.6 | 2.2 | 3.2 | 2.8 | 3.7 | 3.6 |

*Figure 6F*

|  | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| Paraffins, wt.% | 1.184 | 1.435 | 1.207 | 1.170 | 1.108 | 1.420 |
| i-Paraffins, wt.% | 10.161 | 12.389 | 9.598 | 12.120 | 8.545 | 13.330 |
| Olefins, wt.% | 2.944 | 9.159 | 2.555 | 4.858 | 0.976 | 3.900 |
| Naphthenes, wt.% | 3.727 | 5.390 | 3.135 | 3.867 | 2.329 | 4.030 |
| Aromatics, wt.% | 73.968 | 69.233 | 78.758 | 75.037 | 83.315 | 74.720 |
| BTX + Ethylbenzene content in liquid boiling below 240 °C | 54.32 | 51.17 | 58.67 | 53.35 | 62.52 | 52.81 |

*Figure 8*

| Product Composition | Liquid Product boiling below 240 °C from Experiment 1, wt.% | Liquid Product boiling below 240 °C from Experiment 2, wt.% |
|---|---|---|
| Paraffins | 6.5 | 3.1 |
| i-Paraffins | 17.6 | 11.7 |
| Olefins | 11.4 | 7.4 |
| Naphthenes | 3.8 | 2.5 |
| Aromatics | 47.9 | 66.3 |
| Heavies | 3.1 | 3.6 |
| Unknown | 9.8 | 5.5 |

*Figure 9A*

| | Amount, wt.% |
|---|---|
| $H_2$ | 0.03 |
| Methane | 0.00 |
| Ethane | 0.00 |
| Ethylene | 2.25 |
| Carbon Dioxide | 1.54 |
| Propane | 3.39 |
| Propylene | 6.92 |
| i-Butane | 6.48 |
| n-Butane | 1.67 |
| t-2-Butene | 1.71 |
| 1-Butene | 1.04 |
| i-Butylene | 3.37 |
| c-2-Butene | 1.26 |
| Carbon Monoxide | 0.00 |
| Gasoline | 45.28 |
| Diesel | 17.64 |
| Heavies | 2.08 |
| Coke | 5.33 |

*Figure 9B*

| Mass % | Boiling Point, °C |
|---|---|
| 0.0 | 108.6 |
| 5.0 | 156.0 |
| 10.0 | 164.0 |
| 15.0 | 175.6 |
| 20.0 | 180.0 |
| 25.0 | 187.6 |
| 30.0 | 190.2 |
| 35.0 | 198.8 |
| 40.0 | 203.6 |
| 45.0 | 209.2 |
| 50.0 | 220.2 |
| 55.0 | 227.0 |
| 60.0 | 232.0 |
| 65.0 | 246.0 |
| 70.0 | 254.2 |
| 75.0 | 267.4 |
| 80.0 | 281.8 |
| 85.0 | 300.6 |
| 90.0 | 332.0 |
| 95.0 | 371.6 |
| 99.0 | 431.2 |
| 100.0 | 454.2 |

*Figure 9C*

| Carbon No. | n-Paraffins, wt.% | i-Paraffins, wt.% | Olefins, wt.% | Naphthenes, wt.% | Aromatics, wt.% | Total, wt.% |
|---|---|---|---|---|---|---|
| 3 | | | 0.003 | | | 0.003 |
| 4 | 0.007 | 0.012 | 0.041 | | | 0.06 |
| 5 | 0.032 | 0.077 | 0.325 | 0.095 | | 0.529 |
| 6 | 0.173 | 0.566 | 1.025 | 1.009 | 4.757 | 7.53 |
| 7 | 0.379 | 1.379 | 1.547 | 2.095 | 19.393 | 24.793 |
| 8 | 0.398 | 2.443 | 0.198 | 1.518 | 28.466 | 33.023 |
| 9 | 0.046 | 1.911 | 0.134 | 0.958 | 11.254 | 14.303 |
| 10 | 0.019 | 0.916 | 0.02 | 0.156 | 4.448 | 5.559 |
| 11 | 0.022 | 2.114 | | 0.029 | 1.621 | 3.786 |
| 12 | 0.029 | 0.199 | | 0.057 | 3.884 | 4.169 |
| 13 | | 0.078 | 0.111 | | | 0.189 |
| Unknown | | | | | | 2.842 |
| Heavies | | | | | | 3.214 |
| Total, wt.% | 1.105 | 9.695 | 3.404 | 5.917 | 78.823 | 93.944 |
| Total, wt.% on Aromatics-Free Basis | 5.49 | 48.18 | 16.92 | 29.41 | | |

*Figure 10A*

Table 1

| Carbon# | n-paraffins | i-paraffins | olefins | naphthenes | aromatics | total |
|---|---|---|---|---|---|---|
| C2 | 0 | | | | | 0 |
| C3 | | | | | | |
| C4 | | | | | | 0 |
| C5 | 0 | 0.067 | 0.143 | 0 | | 0.21 |
| C6 | 0.078 | 0.273 | 0.206 | 0.059 | 0.093 | 0.709 |
| C7 | 0.129 | 0.487 | 0.095 | 0 | 2.27 | 2.981 |
| C8 | 0 | 0.539 | 0 | 0 | 14.9 | 15.439 |
| C9 | 0.518 | 0.72 | 0 | 0 | 29.07 | 30.308 |
| C10 | 0.752 | 1.062 | 0 | 0 | 11.039 | 12.853 |
| C11 | 0.693 | 2.911 | 0 | 0 | 4.419 | 8.023 |
| C12 | 0.527 | 0.264 | 0 | 0.052 | 9.05 | 9.893 |
| C13 | 0.351 | 0 | 0 | 0 | 0 | 0.351 |
| Total | 3.048 | 6.323 | 0.444 | 0.111 | 70.841 | 80.767 |
| | | | | | Total oxygenates | 0 |
| | | | | | Total Heavies | 16.372 |
| | | | | | Total unknowns | 2.859 |
| | | | | | Grand Total | 99.998 |

*Figure 10B*

Table 2

| Mass% | Degree C | Mass% | Degree C | Mass% | Degree C |
|---|---|---|---|---|---|
| IBP | 132 | 35 | 291.4 | 70 | 296.6 |
| 5 | 174.4 | 40 | 292.2 | 75 | 297.2 |
| 10 | 243.6 | 45 | 293.2 | 80 | 297.6 |
| 15 | 285.2 | 50 | 294 | 85 | 298.2 |
| 20 | 287.4 | 55 | 294.8 | 90 | 298.8 |
| 25 | 289 | 60 | 295.4 | 95 | 299.2 |
| 30 | 290.2 | 65 | 296 | 99 | 328.8 |
| | | | | FBP | 380.2 |

IBP = initial boiling point; FBP = final boiling point.

*Figure 10C*

Table 3

| Carbon# | n-paraffins | i-paraffins | olefins | naphthenes | Aromatics | total |
|---|---|---|---|---|---|---|
| C2 | 0.000 | 0.000 | 0.000 | 0.000 | 0.000 | 0.000 |
| C3 | 0.000 | 0.000 | 0.000 | 0.000 | 0.000 | |
| C4 | 0.000 | 0.000 | 0.000 | 0.000 | 0.000 | 0.000 |
| C5 | 0.000 | 0.008 | 0.017 | 0.000 | 0.000 | 0.025 |
| C6 | 0.009 | 0.033 | 0.025 | 0.007 | 0.011 | 0.085 |
| C7 | 0.016 | 0.059 | 0.011 | 0.000 | 0.274 | 0.359 |
| C8 | 0.000 | 0.065 | 0.000 | 0.000 | 1.797 | 1.862 |
| C9 | 0.062 | 0.087 | 0.000 | 0.000 | 3.506 | 3.655 |
| C10 | 0.091 | 0.128 | 0.000 | 0.000 | 1.331 | 1.550 |
| C11 | 0.084 | 0.351 | 0.000 | 0.000 | 0.533 | 0.968 |
| C12 | 0.064 | 0.032 | 0.000 | 0.006 | 1.091 | 1.193 |
| C13 | 0.042 | 0.000 | 0.000 | 0.000 | 0.000 | 0.042 |
| Total | 0.368 | 0.763 | 0.054 | 0.013 | 8.543 | 9.740 |

*Figure 11A*

Table 4

| Mass% | Deg C | Mass% | Deg C | Mass% | Deg C |
|---|---|---|---|---|---|
| IBP | 61.4 | 35 | 290.2 | 70 | 295.6 |
| 5 | 129.4 | 40 | 291.2 | 75 | 296.2 |
| 10 | 161.2 | 45 | 292.2 | 80 | 297 |
| 15 | 272.4 | 50 | 293 | 85 | 297.4 |
| 20 | 285.2 | 55 | 293.8 | 90 | 297.8 |
| 25 | 287.4 | 60 | 294.4 | 95 | 298.2 |
| 30 | 289 | 65 | 295 | 99 | 298.8 |
| | | | | FBP | 310.8 |

*Figure 11B*

Table 5

| Carbon# | n-paraffins | i-paraffins | Olefins | naphthenes | aromatics | total |
|---|---|---|---|---|---|---|
| C2 | 0.005 | | | | | 0.005 |
| C3 | 0.006 | | | | | |
| C4 | 0.019 | 0.098 | | | | 0.117 |
| C5 | 0.068 | 0.064 | | 0 | | 0.132 |
| C6 | 0.072 | 0.133 | | 25.607 | 0.11 | 25.922 |
| C7 | 0.016 | 0.034 | | 0 | 0 | 0.05 |
| C8 | 0.401 | 13.31 | | 1.268 | 21.179 | 36.158 |
| C9 | 0 | 0.133 | 0.136 | 5.53 | 2.449 | 8.248 |
| C10 | 19.165 | 8.19 | | 0.213 | 0.049 | 27.617 |
| C11 | 0.03 | 0 | | 0 | 0 | 0.03 |
| C12 | 0.011 | 0 | | 0 | 0 | 0.011 |
| C13 | 0 | 0 | | 0 | 0 | 0 |
| | 19.793 | 21.962 | 0.136 | 32.618 | 23.787 | 98.29 |
| | | | | | Total oxygenates | 0 |
| | | | | | Total Heavies | 1.413 |
| | | | | | Total unknowns | 0.29 |
| | | | | | Grand Total | 99.993 |

*Figure 11C*

Table 6

| Carbon# | n-paraffins | i-paraffins | Olefins | naphthenes | aromatics | total |
|---|---|---|---|---|---|---|
| C2 | 0.005 | 0.000 | 0.000 | 0.000 | 0.000 | 0.005 |
| C3 | 0.006 | 0.000 | 0.000 | 0.000 | 0.000 | |
| C4 | 0.019 | 0.100 | 0.000 | 0.000 | 0.000 | 0.119 |
| C5 | 0.069 | 0.065 | 0.000 | 0.000 | 0.000 | 0.134 |
| C6 | 0.073 | 0.135 | 0.000 | 26.052 | 0.112 | 26.373 |
| C7 | 0.016 | 0.035 | 0.000 | 0.000 | 0.000 | 0.051 |
| C8 | 0.408 | 13.542 | 0.000 | 1.290 | 21.547 | 36.787 |
| C9 | 0.000 | 0.135 | 0.138 | 5.626 | 2.492 | 8.391 |
| C10 | 19.498 | 8.332 | 0.000 | 0.217 | 0.050 | 28.097 |
| C11 | 0.031 | 0.000 | 0.000 | 0.000 | 0.000 | 0.031 |
| C12 | 0.011 | 0.000 | 0.000 | 0.000 | 0.000 | 0.011 |
| C13 | 0.000 | 0.000 | 0.000 | 0.000 | 0.000 | 0.000 |
| Total | 20.137 | 22.344 | 0.138 | 33.185 | 24.201 | 100.000 |

*Figure 11D*

Table 7

| Carbon# | n-paraffins | i-paraffins | Olefins | naphthenes | aromatics | Total |
|---|---|---|---|---|---|---|
| C2 | 0.001 | 0.000 | 0.000 | 0.000 | 0.000 | 0.001 |
| C3 | 0.001 | 0.000 | 0.000 | 0.000 | 0.000 | |
| C4 | 0.003 | 0.014 | 0.000 | 0.000 | 0.000 | 0.016 |
| C5 | 0.009 | 0.009 | 0.000 | 0.000 | 0.000 | 0.018 |
| C6 | 0.010 | 0.018 | 0.000 | 3.528 | 0.015 | 3.572 |
| C7 | 0.002 | 0.005 | 0.000 | 0.000 | 0.000 | 0.007 |
| C8 | 0.055 | 1.834 | 0.000 | 0.175 | 2.918 | 4.982 |
| C9 | 0.000 | 0.018 | 0.019 | 0.762 | 0.337 | 1.136 |
| C10 | 2.641 | 1.128 | 0.000 | 0.029 | 0.007 | 3.805 |
| C11 | 0.004 | 0.000 | 0.000 | 0.000 | 0.000 | 0.004 |
| C12 | 0.002 | 0.000 | 0.000 | 0.000 | 0.000 | 0.002 |
| C13 | 0.000 | 0.000 | 0.000 | 0.000 | 0.000 | 0.000 |
| Total | 2.727 | 3.026 | 0.019 | 4.494 | 3.278 | 13.543 |

*Figure 12A*

Table 8

| | T, deg C | P, barg | WHSV, hr$^{-1}$ | H$_2$/ HC, NL/L |
|---|---|---|---|---|
| Example 12 | 300 | 60 | 0.92 | 4.14 |
| Example 13 | 300 | 40 | 0.92 | 4.14 |
| Example 14 | 350 | 40 | 0.92 | 4.14 |
| Example 15 | 400 | 40 | 0.92 | 4.14 |

*Figure 12B*

Table 9

| Carbon# | n-paraffins | i-paraffins | olefins | Naphthenes | Aromatics | total |
|---|---|---|---|---|---|---|
| C2 | | | | | | 0 |
| C3 | | | | | | |
| C4 | 0 | 0.045 | | 0 | | 0.045 |
| C5 | 0.177 | 0.166 | | 0 | | 0.343 |
| C6 | 0.319 | 0.557 | | 22.115 | 0.182 | 23.173 |
| C7 | 0 | 0.133 | 11.716 | 0 | 0 | 11.849 |
| C8 | 1.31 | 0 | | 4.402 | 9.039 | 14.751 |
| C9 | 0 | 0 | | 12.96 | 2.984 | 15.944 |
| C10 | 15.619 | 10.446 | | 0.388 | 0 | 26.453 |
| C11 | 0 | 0 | | 0 | 0 | 0 |
| C12 | 0 | 0 | | 0 | 0 | 0 |
| C13 | 0 | 0 | | 0 | 0 | 0 |
| Total | 17.425 | 11.347 | 11.716 | 39.865 | 12.205 | 92.558 |
| | | | | | Total oxygenates | 0 |
| | | | | | Total Heavies | 6.992 |
| | | | | | Total unknowns | 0.45 |

*Figure 12C*

Table 10

| Carbon# | n-paraffins | i-paraffins | olefins | naphthenes | aromatics | total |
|---|---|---|---|---|---|---|
| C2 | | | | | | 0 |
| C3 | | | | | | |
| C4 | 0.000 | 0.049 | 0.000 | 0.000 | 0.000 | 0.049 |
| C5 | 0.191 | 0.179 | 0.000 | 0.000 | 0.000 | 0.371 |
| C6 | 0.345 | 0.602 | 0.000 | 23.893 | 0.197 | 25.036 |
| C7 | 0.000 | 0.144 | 12.658 | 0.000 | 0.000 | 12.802 |
| C8 | 1.415 | 0.000 | 0.000 | 4.756 | 9.766 | 15.937 |
| C9 | 0.000 | 0.000 | 0.000 | 14.002 | 3.224 | 17.226 |
| C10 | 16.875 | 11.286 | 0.000 | 0.419 | 0.000 | 28.580 |
| C11 | 0.000 | 0.000 | 0.000 | 0.000 | 0.000 | 0.000 |
| C12 | 0.000 | 0.000 | 0.000 | 0.000 | 0.000 | 0.000 |
| C13 | 0.000 | 0.000 | 0.000 | 0.000 | 0.000 | 0.000 |
| Total | 18.826 | 12.259 | 12.658 | 43.070 | 13.186 | 100.000 |

*Figure 12D*

Table 11

| Mass% | Deg C | Mass% | Deg C | Mass% | Deg C |
|---|---|---|---|---|---|
| IBP | 72 | 35 | 288.6 | 70 | 292.8 |
| 5 | 87.6 | 40 | 289.4 | 75 | 293.6 |
| 10 | 160.2 | 45 | 290.2 | 80 | 293.8 |
| 15 | 280.4 | 50 | 290.8 | 85 | 294.2 |
| 20 | 284.8 | 55 | 291.4 | 90 | 294.8 |
| 25 | 286.4 | 60 | 292 | 95 | 295.2 |
| 30 | 287.4 | 65 | 292.4 | 99 | 295.6 |
| | | | | FBP | 295.6 |

*Figure 12E*

Table 12

| Carbon# | n-paraffins | i-paraffins | olefins | naphthenes | aromatics | total |
|---|---|---|---|---|---|---|
| C2 | 0.000 | 0.000 | 0.000 | 0.000 | 0.000 | 0.000 |
| C3 | 0.000 | 0.000 | 0.000 | 0.000 | 0.000 | 0.000 |
| C4 | 0.000 | 0.006 | 0.000 | 0.000 | 0.000 | 0.006 |
| C5 | 0.025 | 0.024 | 0.000 | 0.000 | 0.000 | 0.049 |
| C6 | 0.046 | 0.080 | 0.000 | 3.182 | 0.026 | 3.335 |
| C7 | 0.000 | 0.019 | 1.686 | 0.000 | 0.000 | 1.705 |
| C8 | 0.189 | 0.000 | 0.000 | 0.633 | 1.301 | 2.123 |
| C9 | 0.000 | 0.000 | 0.000 | 1.865 | 0.429 | 2.294 |
| C10 | 2.248 | 1.503 | 0.000 | 0.056 | 0.000 | 3.807 |
| C11 | 0.000 | 0.000 | 0.000 | 0.000 | 0.000 | 0.000 |
| C12 | 0.000 | 0.000 | 0.000 | 0.000 | 0.000 | 0.000 |
| C13 | 0.000 | 0.000 | 0.000 | 0.000 | 0.000 | 0.000 |
| Total | 2.508 | 1.633 | 1.686 | 5.737 | 1.756 | 13.319 |

*Figure 12F*

Table 13

| Carbon# | n-paraffins | i-paraffins | Olefins | naphthenes | aromatics | total |
|---|---|---|---|---|---|---|
| C2 | 0.000 | 0.000 | 0.000 | 0.000 | 0.000 | 0.000 |
| C3 | 0.000 | 0.000 | 0.000 | 0.000 | 0.000 | 0.000 |
| C4 | 0.000 | 0.006 | 0.000 | 0.000 | 0.000 | 0.006 |
| C5 | 0.025 | 0.016 | -0.017 | 0.000 | 0.000 | 0.024 |
| C6 | 0.036 | 0.047 | -0.025 | 3.175 | 0.015 | 3.249 |
| C7 | -0.016 | -0.040 | 1.675 | 0.000 | -0.274 | 1.346 |
| C8 | 0.189 | -0.065 | 0.000 | 0.633 | -0.496 | 0.261 |
| C9 | -0.062 | -0.087 | 0.000 | 1.865 | -3.076 | -1.361 |
| C10 | 2.157 | 1.375 | 0.000 | 0.056 | -1.331 | 2.257 |
| C11 | -0.084 | -0.351 | 0.000 | 0.000 | -0.533 | -0.968 |
| C12 | -0.064 | -0.032 | 0.000 | -0.006 | -1.091 | -1.193 |
| C13 | -0.042 | 0.000 | 0.000 | 0.000 | 0.000 | -0.042 |
| Total | 2.140 | 0.870 | 1.632 | 5.723 | -6.787 | 3.580 |

*Figure 13A*

Table 14

| Carbon# | n-paraffins | i-paraffins | olefins | naphthenes | Aromatics | total |
|---|---|---|---|---|---|---|
| C3 | | | | | | |
| C4 | 0.037 | 0.035 | | | | 0.072 |
| C5 | 0.139 | 0.282 | | 0 | | 0.421 |
| C6 | 1.278 | 0.893 | | 8.257 | 0.131 | 10.559 |
| C7 | 0.161 | 0.637 | 4.408 | 0.649 | 1.397 | 7.252 |
| C8 | 1.333 | 0.304 | 0.283 | 2.241 | 17.316 | 21.477 |
| C9 | 0.259 | 1.158 | 0.178 | 4.124 | 13.44 | 19.159 |
| C10 | 11.524 | 6.056 | 0 | 0 | 5.012 | 22.592 |
| C11 | 0.461 | 1.642 | 0 | 0 | 0.887 | 2.99 |
| C12 | 0.334 | 0.145 | 0 | 0.574 | 0.835 | 1.888 |
| C13 | 0.2 | 0 | 0.095 | 0 | 0 | 0.295 |
| Total | 15.726 | 11.152 | 4.964 | 15.845 | 39.018 | 86.705 |
| | | | | | Total oxygenates | 0 |
| | | | | | Total Heavies | 8.171 |
| | | | | | Total unknowns | 5.124 |
| | | | | | Grand Total | 100 |

*Figure 13B*

Table 15

| Carbon# | n-paraffins | i-paraffins | olefins | naphthenes | Aromatics | total |
|---|---|---|---|---|---|---|
| C3 | | | | | | |
| C4 | 0.043 | 0.040 | 0.000 | 0.000 | 0.000 | 0.083 |
| C5 | 0.160 | 0.325 | 0.000 | 0.000 | 0.000 | 0.486 |
| C6 | 1.474 | 1.030 | 0.000 | 9.523 | 0.151 | 12.178 |
| C7 | 0.186 | 0.735 | 5.084 | 0.749 | 1.611 | 8.364 |
| C8 | 1.537 | 0.351 | 0.326 | 2.585 | 19.971 | 24.770 |
| C9 | 0.299 | 1.336 | 0.205 | 4.756 | 15.501 | 22.097 |
| C10 | 13.291 | 6.985 | 0.000 | 0.000 | 5.781 | 26.056 |
| C11 | 0.532 | 1.894 | 0.000 | 0.000 | 1.023 | 3.448 |
| C12 | 0.385 | 0.167 | 0.000 | 0.662 | 0.963 | 2.177 |
| C13 | 0.231 | 0.000 | 0.110 | 0.000 | 0.000 | 0.340 |
| Total | 18.137 | 12.862 | 5.725 | 18.275 | 45.001 | 100.000 |

*Figure 13C*

Table 16

| Mass% | Deg C | Mass% | Deg C | Mass% | Deg C |
|---|---|---|---|---|---|
| IBP | 72 | 35 | 289 | 70 | 293.8 |
| 5 | 134.6 | 40 | 290 | 75 | 294.4 |
| 10 | 180.6 | 45 | 290.8 | 80 | 294.8 |
| 15 | 277.8 | 50 | 291.4 | 85 | 295.4 |
| 20 | 285 | 55 | 292.2 | 90 | 295.8 |
| 25 | 286.8 | 60 | 292.8 | 95 | 296.2 |
| 30 | 288 | 65 | 293.4 | 99 | 296.6 |
| | | | | FBP | 296.6 |

*Figure 13D*

Table 17

| Carbon# | n-paraffins | i-paraffins | olefins | naphthenes | Aromatics | total |
|---|---|---|---|---|---|---|
| C3 | | | | | | |
| C4 | 0.006 | 0.005 | 0.000 | 0.000 | 0.000 | 0.011 |
| C5 | 0.021 | 0.042 | 0.000 | 0.000 | 0.000 | 0.063 |
| C6 | 0.192 | 0.134 | 0.000 | 1.243 | 0.020 | 1.590 |
| C7 | 0.024 | 0.096 | 0.664 | 0.098 | 0.210 | 1.092 |
| C8 | 0.201 | 0.046 | 0.043 | 0.337 | 2.607 | 3.234 |
| C9 | 0.039 | 0.174 | 0.027 | 0.621 | 2.024 | 2.885 |
| C10 | 1.735 | 0.912 | 0.000 | 0.000 | 0.755 | 3.402 |
| C11 | 0.069 | 0.247 | 0.000 | 0.000 | 0.134 | 0.450 |
| C12 | 0.050 | 0.022 | 0.000 | 0.086 | 0.126 | 0.284 |
| C13 | 0.030 | 0.000 | 0.014 | 0.000 | 0.000 | 0.044 |
| Total | 2.368 | 1.679 | 0.747 | 2.386 | 5.875 | 13.056 |

*Figure 13E*

Table 18

| Carbon# | n-paraffins | i-paraffins | olefins | naphthenes | aromatics | total |
|---|---|---|---|---|---|---|
| C3 | | | | | | |
| C4 | 0.006 | 0.005 | 0.000 | 0.000 | 0.000 | 0.011 |
| C5 | 0.021 | 0.034 | -0.017 | 0.000 | 0.000 | 0.038 |
| C6 | 0.183 | 0.102 | -0.025 | 1.236 | 0.009 | 1.504 |
| C7 | 0.009 | 0.037 | 0.652 | 0.098 | -0.063 | 0.732 |
| C8 | 0.201 | -0.019 | 0.043 | 0.337 | 0.811 | 1.372 |
| C9 | -0.023 | 0.088 | 0.027 | 0.621 | -1.482 | -0.770 |
| C10 | 1.645 | 0.784 | 0.000 | 0.000 | -0.577 | 1.852 |
| C11 | -0.014 | -0.104 | 0.000 | 0.000 | -0.399 | -0.517 |
| C12 | -0.013 | -0.010 | 0.000 | 0.080 | -0.966 | -0.909 |
| C13 | -0.012 | 0.000 | 0.014 | 0.000 | 0.000 | 0.002 |
| Total | 2.000 | 0.917 | 0.694 | 2.372 | -2.668 | 3.316 |

*Figure 14A*

Table 19

| Carbon# | n-paraffins | i-paraffins | Olefins | naphthenes | aromatics | total |
|---|---|---|---|---|---|---|
| C3 | | | | | | |
| C4 | 0.112 | 0.057 | | | | 0.169 |
| C5 | 0.364 | 0.426 | | 0.031 | | 0.821 |
| C6 | 1.483 | 1.135 | | 3.629 | 0.105 | 6.352 |
| C7 | 0.511 | 1.096 | 1.892 | 1.701 | 1.329 | 6.529 |
| C8 | 1.898 | 1.151 | 0 | 3.914 | 11.697 | 18.66 |
| C9 | 0.924 | 2.268 | 0.783 | 3.121 | 11.839 | 18.935 |
| C10 | 4.118 | 2.968 | 0.164 | 0.257 | 4.67 | 12.177 |
| C11 | 0.823 | 2.294 | 0.108 | 0 | 0.67 | 3.895 |
| C12 | 0.663 | 0.218 | 0 | 0.606 | 1.161 | 2.648 |
| C13 | 0.384 | 0.201 | 0.11 | 0 | 0 | 0.695 |
| Total | 11.28 | 11.814 | 3.057 | 13.259 | 31.471 | 70.881 |
| | | | | | Total oxygenates | 0 |
| | | | | | Total Heavies | 20.145 |
| | | | | | Total unknowns | 8.974 |
| | | | | | Grand Total | 100 |

*Figure 14B*

Table 20

| Carbon# | n-paraffins | i-paraffins | Olefins | naphthenes | aromatics | total |
|---|---|---|---|---|---|---|
| C3 | | | | | | |
| C4 | 0.158 | 0.080 | 0.000 | 0.000 | 0.000 | 0.238 |
| C5 | 0.514 | 0.601 | 0.000 | 0.044 | 0.000 | 1.158 |
| C6 | 2.092 | 1.601 | 0.000 | 5.120 | 0.148 | 8.961 |
| C7 | 0.721 | 1.546 | 2.669 | 2.400 | 1.875 | 9.211 |
| C8 | 2.678 | 1.624 | 0.000 | 5.522 | 16.502 | 26.326 |
| C9 | 1.304 | 3.200 | 1.105 | 4.403 | 16.703 | 26.714 |
| C10 | 5.810 | 4.187 | 0.231 | 0.363 | 6.589 | 17.179 |
| C11 | 1.161 | 3.236 | 0.152 | 0.000 | 0.945 | 5.495 |
| C12 | 0.935 | 0.308 | 0.000 | 0.855 | 1.638 | 3.736 |
| C13 | 0.542 | 0.284 | 0.155 | 0.000 | 0.000 | 0.981 |
| Total | 15.914 | 16.667 | 4.313 | 18.706 | 44.400 | 100.000 |

*Figure 14C*

Table 21

| Mass% | Deg C | Mass% | Deg C | Mass% | Deg C |
|---|---|---|---|---|---|
| IBP | 72 | 35 | 285.6 | 70 | 293.2 |
| 5 | 137.2 | 40 | 287.4 | 75 | 293.8 |
| 10 | 183.6 | 45 | 288.8 | 80 | 294.4 |
| 15 | 261.2 | 50 | 290 | 85 | 295 |
| 20 | 272.2 | 55 | 290.8 | 90 | 295.6 |
| 25 | 277.6 | 60 | 291.6 | 95 | 296.2 |
| 30 | 281.4 | 65 | 292.4 | 99 | 296.4 |
| | | | | FBP | 296.4 |

*Figure 14D*

Table 22

| Carbon# | n-paraffins | i-paraffins | Olefins | naphthenes | aromatics | total |
|---|---|---|---|---|---|---|
| C3 | | | | | | |
| C4 | 0.021 | 0.011 | 0.000 | 0.000 | 0.000 | 0.032 |
| C5 | 0.069 | 0.081 | 0.000 | 0.006 | 0.000 | 0.156 |
| C6 | 0.282 | 0.216 | 0.000 | 0.691 | 0.020 | 1.210 |
| C7 | 0.097 | 0.209 | 0.360 | 0.324 | 0.253 | 1.243 |
| C8 | 0.361 | 0.219 | 0.000 | 0.745 | 2.228 | 3.554 |
| C9 | 0.176 | 0.432 | 0.149 | 0.594 | 2.255 | 3.606 |
| C10 | 0.784 | 0.565 | 0.031 | 0.049 | 0.889 | 2.319 |
| C11 | 0.157 | 0.437 | 0.021 | 0.000 | 0.128 | 0.742 |
| C12 | 0.126 | 0.042 | 0.000 | 0.115 | 0.221 | 0.504 |
| C13 | 0.073 | 0.038 | 0.021 | 0.000 | 0.000 | 0.132 |
| Total | 2.148 | 2.250 | 0.582 | 2.525 | 5.993 | 13.499 |

*Figure 14E*

Table 23

| Carbon# | n-paraffins | i-paraffins | Olefins | naphthenes | aromatics | Total |
|---|---|---|---|---|---|---|
| C3 | | | | | | |
| C4 | 0.021 | 0.011 | 0.000 | 0.000 | 0.000 | 0.032 |
| C5 | 0.069 | 0.073 | -0.017 | 0.006 | 0.000 | 0.131 |
| C6 | 0.273 | 0.183 | -0.025 | 0.684 | 0.009 | 1.124 |
| C7 | 0.082 | 0.150 | 0.349 | 0.324 | -0.021 | 0.884 |
| C8 | 0.361 | 0.154 | 0.000 | 0.745 | 0.431 | 1.692 |
| C9 | 0.114 | 0.345 | 0.149 | 0.594 | -1.251 | -0.049 |
| C10 | 0.694 | 0.437 | 0.031 | 0.049 | -0.442 | 0.769 |
| C11 | 0.073 | 0.086 | 0.021 | 0.000 | -0.405 | -0.226 |
| C12 | 0.063 | 0.010 | 0.000 | 0.109 | -0.870 | -0.689 |
| C13 | 0.031 | 0.038 | 0.021 | 0.000 | 0.000 | 0.090 |
| Total | 1.781 | 1.487 | 0.529 | 2.512 | -2.549 | 3.759 |

*Figure 15A*

Table 24

| Mass% | Deg C | Mass% | Deg C | Mass% | Deg C |
|---|---|---|---|---|---|
| IBP | 36 | 35 | 272.4 | 70 | 287.6 |
| 5 | 114.2 | 40 | 276 | 75 | 288.4 |
| 10 | 154.8 | 45 | 278 | 80 | 289.2 |
| 15 | 181.2 | 50 | 279.8 | 85 | 289.8 |
| 20 | 227.2 | 55 | 283.4 | 90 | 290.2 |
| 25 | 263 | 60 | 285.6 | 95 | 290.8 |
| 30 | 268.8 | 65 | 286.8 | 99 | 291.2 |
| | | | | FBP | 291.4 |

*Figure 15B*

Table 25

| Liquid Product | Feed | Example 12 | Example 13 | Example 14 | Example 15 |
|---|---|---|---|---|---|
| < 240 °C, Wt.% | 9.7 | 13.3 | 13.1 | 13.5 | 21.8 |
| < 280 °C, Wt.% | 14.4 | 15.0 | 16.5 | 28.2 | 50.3 |
| Cl in overall product, ppmw | 836 | 0.32 | 0.87 | 3.42 | 3.15 |

*Figure 16A*

| Catalyst recipe | 80% spent FCC catalyst + 20% ZSM-5 zeolite catalyst | 80% spent FCC catalyst + 20% ZSM-5 zeolite catalyst | 65% spent FCC catalyst + 35% ZSM-5 zeolite catalyst |
|---|---|---|---|
| | Low severity | High severity | High severity |
| Avg cup mix temp, °C | 452 | 521 | 553.9 |
| Product yields, wt.% | | | |
| H2-C4 gas | 47.90 | 55.1 | 61.6 |
| Liquids | 43.30 | 35.9 | 31.3 |
| Coke | 8.80 | 6.2 | 5.6 |
| Light gas olefins | 28.55 | 36.61 | 41.65 |
| Gas Saturates | 17.32 | 15.93 | 17.62 |
| Gasoline | 37.00 | 30.37 | 24.54 |
| Diesel | 5.31 | 4.43 | 5.36 |
| Heavies | 0.99 | 1.06 | 1.41 |

| Product composition of mixed plastic pyrolysis after cracking | Thermally cracked from modular technology unit | Catalytically cracked from circulating fluidized bed |
|---|---|---|
| P | 45 | 9.5 |
| O | 34 | 4.2 |
| N | 11 | 3.6 |
| A | 9.4 | 82.7 |

| Product composition of mixed plastic pyrolyzed liquid after hydro treating | Thermally cracked from modular technology unit | Catalytically cracked from circulating fluidized bed |
|---|---|---|
| P | 62 | 11.6 |
| O | 0 | 0.0 |
| N | 28.6 | 5.7 |
| A | 9.4 | 82.7 |

*Figure 16B*

| Component | Steam cracker product wt.% |
|---|---|
| Methane | 14.2 |
| Hydrogen | |
| Ethylene | 32.8 |
| Propylene | 17.8 |
| Butylenes | |
| Saturates | 16.3 |
| Gasoline | 14.5 |
| Diesel | 4.4 |

*Figure 17*

| Catalyst recipe | 80% spent FCC catalyst + 20% ZSM-5 zeolite catalyst | 80% spent FCC catalyst + 20% ZSM-5 zeolite catalyst | 65% spent FCC catalyst + 35% ZSM-5 zeolite catalyst |
|---|---|---|---|
| | Low severity | High severity | High severity |
| Avg cup mix temp, °C | 452 | 521 | 553.9 |
| Gas saturates feed to gas cracker | 17.32 | 15.93 | 17.62 |
| Gasoline yield | 37.40 | 30.37 | 24.54 |
| C6-C8 aromatics concentration in liquid | 49.3 | 52.27 | 54.9 |
| Gasoline saturates yields after C6-C8 aromatics separation | 18.96 | 14.50 | 11.07 |
| Diesel and heavies yield | 6.30 | 5.49 | 6.77 |
| Diesel and Heavies saturated liquid yield after hydrotreating (calculated assuming complete saturation) | 6.69 | 5.83 | 7.19 |

*Figure 18A*

| Catalyst recipe | 65% spent FCC catalyst + 35% ZSM-5 zeolite catalyst |
|---|---|
| | High severity |
| Avg cup mix temp, °C | 553.9 |
| Product yields, wt.% | |
| H2-C4 gas | 61.6 |
| Liquids | 31.3 |
| Coke | 5.6 |
| Light gas olefins | 41.65 |
| Gas Saturates | 17.62 |
| Gasoline | 24.54 |
| Diesel | 5.36 |
| Heavies | 1.41 |
| C6-C8 aromatics | 13.47 |

*Figure 18B*

|  | Wt% |
|---|---|
| Hydrogen | 0.22 |
| Methane | 3.79 |
| Acetylene | 0.07 |
| Ethylene | 6.38 |
| Ethane | 1.23 |
| MAPD | 0.08 |
| Propylene | 2.62 |
| Propane | 0.48 |
| Butadiene | 0.54 |
| Butylene | 0.25 |
| Butanes | 0.60 |
| Pentanes | 0.28 |
| Benzene | 0.42 |
| Toluene | 0.16 |
| Xylene | 0.05 |
| C6-C8 PON | 0.21 |
| Heavies | 0.24 |

*Figure 18C*

|  | Wt% |
|---|---|
| Hydrogen | 0.19 |
| Methane | 3.15 |
| Acetylene | 0.20 |
| Ethylene | 5.83 |
| Ethane | 0.65 |
| MAPD | 0.08 |
| Propylene | 2.60 |
| Propane | 0.09 |
| Butadiene | 0.80 |
| Butylene | 0.82 |
| Butanes | 0.05 |
| Pentanes | 0.37 |
| Benzene | 0.74 |
| Toluene | 0.28 |
| Xylene | 0.57 |
| C8H10 | 0.12 |
| C6-C8 PON | 0.37 |
| C9-200 GLN | 0.37 |
| FO | 0.54 |

INTEGRATED PROCESS CONFIGURATION INVOLVING THE STEPS OF PYROLYSIS, HYDROCRACKING, HYDRODEALKYLATION AND STEAM CRACKING

CROSS-REFERENCE TO RELATED APPLICATIONS

This application is a national phase application under 35 U.S.C. § 371 of International Application No. PCT/IB2017/055742 filed Sep. 21, 2017, which claims priority to U.S. Provisional Patent Application No. 62/398,328 filed Sep. 22, 2016. The entire contents of each of the above-referenced disclosures is specifically incorporated by reference herein without disclaimer.

TECHNICAL FIELD

This disclosure relates to the production of hydrocarbon streams from mixed plastics via processes which include pyrolysis, hydroprocessing, hydrodealkylation, and steam cracking, wherein mono-ring aromatics in the $C_6$-$C_8$ range and light gas olefins are the preferred products.

BACKGROUND

Waste plastics may contain polyvinylchloride (PVC) and/or polyvinylidene chloride (PVDC). Through a pyrolysis process, waste plastics can be converted to gas and liquid products. These liquid products may contain paraffins, iso-paraffins, olefins, naphthenes, and aromatic components along with organic chlorides in concentrations of hundreds of ppm. However, the liquid products of a pyrolysis process (e.g., pyrolysis oils) might not be used as a feedstock for steam crackers due to feed specifications requiring very low concentrations of chlorides and limited olefin content. Thus, there is an ongoing need to develop methods for producing hydrocarbon feedstocks derived from waste plastics to meet certain steam cracker feed requirements.

BRIEF DESCRIPTION OF THE DRAWINGS

FIG. 2 displays a data table for Example 1;

FIGS. 3A and 3B display data tables for Example 2;

FIGS. 4A and 4B display data tables for Example 4;

FIGS. 5A and 5B display data tables for Example 5;

FIGS. 6A, 6B, 6C, 6D, 6E and 6F display data tables for Example 6;

FIG. 8 displays a data table for Example 7;

FIGS. 9A, 9B, and 9C display data tables for Example 9;

FIGS. 10A, 10B, and 10C display data tables for Example 10;

FIGS. 11A, 11B, 11C and 11D display data tables for Example 11;

FIGS. 12A, 12B, 12C, 12D, 12E and 12F display data tables for Example 12;

FIGS. 13A, 13B, 13C, 13D, and 13E display data tables for Example 13;

FIGS. 14A, 14B, 14C, 14D, and 14E display data tables for Example 14;

FIGS. 15A and 15B display data tables for Example 15;

FIGS. 16A and 16B display data tables for Example 17;

FIG. 17 displays a data table for Example 18; and

FIGS. 18A, 18B, and 18C display data tables for Example 19.

DETAILED DESCRIPTION

Disclosed herein are processes and systems for processing plastic waste to produce high value products, such as olefins and aromatic compounds. The processing may include recovering a hydrocarbon liquid stream from a pyrolysis unit; producing a treated hydrocarbon stream and a first heavies stream from the hydrocarbon liquid stream; and producing a second hydrocarbon product from the first heavies stream, where an amount of $C_6$ to $C_8$ aromatic hydrocarbons in the second hydrocarbon product is greater than an amount of $C_6$ to $C_8$ aromatic hydrocarbons in the first heavies stream. The processes may further include feeding at least a portion of the treated hydrocarbon stream to a steam cracker to produce a steam cracker product stream. For purposes of the disclosure herein, the term "amount" refers to a weight % of a given component in a particular composition, based upon the total weight of that particular composition (e.g., the total weight of all components present in that particular composition), unless otherwise indicated.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The endpoints of all ranges directed to the same component or property are inclusive of the endpoint and independently combinable. The term "X or more" means that the named component is present in an amount of the value X, and values which are more than X.

The terms "a," "an," and "the" do not denote a limitation of quantity, but rather denote the presence of at least one of the referenced item. As used herein the singular forms "a," "an," and "the" include plural referents.

As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like.

Processes for processing of mixed plastics (e.g., plastic waste) are described in more detail with reference to FIG. 1.

Figure 1:
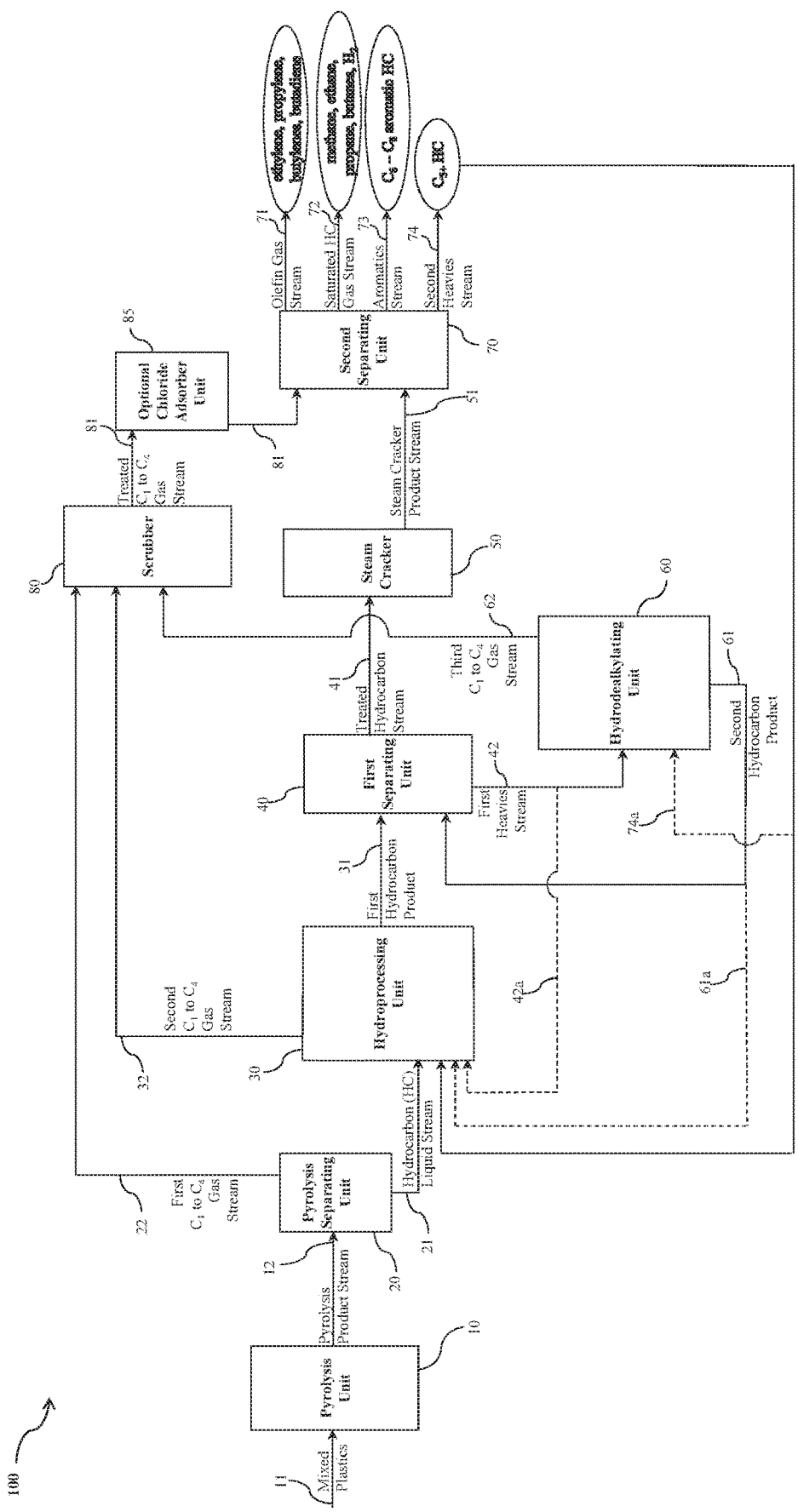
FIG. 1 displays a mixed plastics processing system for producing hydrocarbon streams.

FIG. 1 illustrates a mixed plastics processing system 100 which pyrolizes plastics and dechlorinates chloride compounds, hydrocracks long chain molecules, hydrodealkylates alkylated aromatic hydrocarbons, and may additionally hydrogenate olefins and further dechlorinate chloride compounds to provide for a feed that meets requirements for introduction to a steam cracker 50. The system 100 includes a pyrolysis unit 10, a pyrolysis separating unit 20, a hydroprocessing unit 30, a first separating unit 40, a steam cracker 50, a hydrodealkylating unit 60, a second separating unit 70, a scrubber 80, and an optional chloride adsorber unit 85.

A process for processing plastic waste (e.g., mixed plastics) can comprise a step of converting a plastic waste to a hydrocarbon liquid stream and a first $C_1$ to $C_4$ gas stream in a pyrolysis unit. The process can comprise introducing the mixed plastics to a pyrolysis unit to produce a pyrolysis product (e.g., hydrocarbon (HC) product), wherein the pyrolysis product comprises a gas phase and a liquid phase.

Mixed plastics (e.g., waste plastics) can be either placed in the pyrolysis unit 10 or fed to the pyrolysis unit 10 via mixed plastics stream 11. In the pyrolysis unit 10, the mixed plastics stream 11 is converted via pyrolysis to a pyrolysis product stream 12, wherein the pyrolysis product stream 12 comprises a gas phase (e.g., pyrolysis gases, such as $C_1$ to $C_4$ gases, carbon monoxide (CO), carbon dioxide ($CO_2$), hydrochloric acid (HCl) gas, etc.) and a liquid phase (e.g., pyrolysis liquid).

Mixed plastics which are loaded into or fed to the pyrolysis unit 10 via mixed plastics stream 11 may include post-consumer waste plastics, such as mixed plastic waste. Mixed plastics can comprise chlorinated plastics (e.g., chlorinated polyethylene), polyvinylchloride (PVC), polyvinylidene chloride (PVDC), non-chlorinated plastics (e.g., polyolefins, polyethylene, polypropylene, polyethylene terephthalate (PET), polybutylene terephthalate, polystyrene, copolymers, etc.), and the like, or mixtures thereof. In some aspects, the mixed plastics can comprise PVC, PVDC, polyethylene terephthalate, polybutylene terephthalate, polyolefins, polystyrenes, and the like, or combinations thereof. Generally, waste plastics comprise long chain molecules or polymer hydrocarbons. Waste plastics as disclosed herein also include used tires. The mixed plastics can comprise virgin mixed plastics and/or waste mixed plastics.

The mixed plastics stream 11 can comprise chloride in an amount of equal to or greater than about 10 parts per million weight (ppmw), 50 ppmw, 100 ppmw, 200 ppmw, 300 ppmw, 400 ppmw, 500 ppmw, 600 ppmw, 700 ppmw, 800 ppmw, 900 ppmw, 600 ppmw, or 1,000 ppmw chloride, based on the total weight of the mixed plastics. The mixed plastics stream 11 can comprise PVC and/or PVDC in an amount of equal to or greater than about 400 ppmw, alternatively equal to or greater than about 700 ppmw, or alternatively equal to or greater than about 1,000 ppmw, based on the total weight of the mixed plastics.

The pyrolysis unit 10 may be any suitable vessel configured to convert waste plastics into gas phase and liquid phase products (e.g., simultaneously). The vessel may be configured for gas phase, liquid phase, vapor-liquid phase, gas-solid phase, gas-liquid-solid phase, or slurry phase operation. The vessel may contain one or more beds of inert material or pyrolysis catalyst comprising sand, zeolite, alumina, a catalytic cracking catalyst, or combinations thereof. Generally, the pyrolysis catalyst is capable of transferring heat to the components subjected to the pyrolysis process in the pyrolysis unit 10. Alternatively, the pyrolysis unit 10 can be operated without any catalyst (e.g., pure thermal pyrolysis). The pyrolysis unit 10 may be operated adiabatically, isothermally, nonadiabatically, non-isothermally, or combinations thereof. The pyrolysis reactions of this disclosure may be carried out in a single stage or in multiple stages. For example, the pyrolysis unit 10 can be two reactor vessels fluidly connected in series.

In a configuration where the pyrolysis unit 10 comprises two vessels, the pyrolysis process may be divided into a first stage which is performed in a first vessel and in a second stage fluidly connected downstream of the first stage which is performed in the second vessel. As will be appreciated by one of skill in the art, and with the help of this disclosure, the second stage may enhance the pyrolysis of an intermediate pyrolysis product stream flowing from the first stage into the second stage, to yield a pyrolysis product stream 12 flowing from the second stage. In some configurations, the first stage may utilize thermal cracking of the waste plastics, and the second stage may utilize thermal or catalytic cracking of the waste plastics to yield the pyrolysis product stream 12 flowing from the second stage. Alternatively, the first stage may utilize catalytic cracking of the waste plastics, and the second stage may utilize thermal or catalytic cracking of the waste plastics to yield the pyrolysis product stream 12 flowing from the second stage.

In some configurations, the pyrolysis unit 10 may include one or more equipment configured to convert mixed plastics into gas phase and liquid phase products. The one or more equipment may or may not contain an inert material or pyrolysis catalyst as described above. Examples of such equipment include one or more of heated extruders, heated rotating kiln, heated tank-type reactors, packed bed reactors, bubbling fluidized bed reactors, circulating fluidized bed reactors, empty heated vessels, enclosed heated surfaces where plastic flows down along the wall and cracks, vessels surrounded by ovens or furnaces or other equipment offering a heated surface to assist in cracking.

The pyrolysis unit 10 can be configured to pyrolyse (e.g., crack), and in some aspects (e.g., where hydrogen is added to the pyrolysis unit 10), additionally hydrogenate components of the mixed plastics stream 11 fed to the pyrolysis unit 10. Examples of reactions which may occur in the pyrolysis unit 10 include, but are not limited to conversion of one or more aromatics to one or more cycloparaffins, isomerization of one or more normal paraffins to one or more i-paraffins, selective ring opening of one or more cycloparaffins to one or more i-paraffins, cracking of long chain length molecules to short chain length molecules, removal of heteroatoms from heteroatom-containing hydrocarbons (e.g., dechlorination), hydrogenation of coke generated in the process, or combinations thereof.

In one or more configurations of the pyrolysis unit 10, a head space purge gas is utilized in all or a portion of the pyrolysis stage(s) (conversion of waste plastics to a liquid phase and/or gas phase products) to enhance cracking of plastics, produce valuable products, provide a feed for steam cracking, or combinations thereof. The head space purge gas may include hydrogen ($H_2$), $C_1$ to $C_4$ hydrocarbon gases (e.g., alkanes, methane, ethane, propane, butane, isobutane), inert gases (e.g., nitrogen ($N_2$), argon, helium, steam), and the like, or combinations thereof. The use of a head space purge gas assists in the dechlorination in the pyrolysis unit 10. The head space purge gas may be introduced to the pyrolysis unit 10 to aid in the removal of volatiles entrained in the melted mixed plastics present in the pyrolysis unit 10.

A hydrogen ($H_2$) containing stream can be added to the pyrolysis unit 10 to enrich the pyrolysis unit environment with $H_2$, assist in stripping entrapped hydrogen chloride in the pyrolysis unit, provide a local environment rich in hydrogen in the pyrolysis melt or liquid, or combinations thereof; for example via a $H_2$ containing stream fed directly to the pyrolysis unit independently of the mixed plastics stream 11. In some aspects, $H_2$ can also be introduced along with stream 11 to the pyrolysis unit 10, with adequate safety measures incorporated for hydrogen handling with plastics feed.

The pyrolysis unit 10 may facilitate any reaction of the components of the mixed plastics stream 11 in the presence of, or with, hydrogen. Reactions may occur such as the addition of hydrogen atoms to double bonds of unsaturated molecules (e.g., olefins, aromatic compounds, coke formed), resulting in saturated molecules (e.g., paraffins, i-paraffins, naphthenes). Additionally or alternatively, reactions in the pyrolysis unit 10 may cause a rupture of a bond of an organic compound, with a subsequent reaction and/or replacement of a heteroatom with hydrogen.

The use of hydrogen in the pyrolysis unit 10 can have beneficial effects of i) reducing the coke as a result of cracking, ii) keeping the catalyst used (if any) in the process in an active condition, iii) improving removal of chloride from stream 11 such that the pyrolysis product stream 12 from pyrolysis unit 10 is substantially dechlorinated with respect to mixed plastics stream 11, which minimizes the chloride removal requirement in units downstream of the pyrolysis unit 10, iv) hydrogenating of olefins, v) reducing diolefins in pyrolysis product stream 12, vi) helping operate the pyrolysis unit 10 at reduced temperatures for same levels of conversion of mixed plastics stream 11 in the pyrolysis unit 10, or combinations of i)-vi).

The pyrolysis processes in the pyrolysis unit 10 may be low severity or high severity. Low severity pyrolysis processes may occur at a temperature of 250° C. to 450° C., alternatively 275° C. to 425° C., or alternatively 300° C. to 400° C., may produce pyrolysis oils rich in mono- and di-olefins as well as a significant amount of aromatics, and may include chloride compounds in amounts which cause the pyrolysis product stream 12 to have the chloride compound content disclosed herein. High severity pyrolysis processes may occur at a temperature of 450° C. to 750° C., alternatively 500° C. to 700° C., or alternatively 550° C. to 650° C., and may produce pyrolysis oils rich in aromatics. The liquid product of the high severity processes may include chloride compounds which cause the pyrolysis product stream 12 to have the chloride compound content disclosed herein.

In some configurations, the pyrolysis unit 10 can comprise a devolatilization extruder. A purging gas can be introduced to the pyrolysis unit 10 to facilitate removal of gaseous chloride containing species from the pyrolysis unit 10. Devolatilization extruders that can be used for mixed plastic pyrolysis and processing are described in more detail in U.S. Provisional Patent Application No. 62/369,379 filed on Aug. 1, 2016.

An example of a pyrolysis process for waste plastics is disclosed in U.S. Pat. No. 8,895,790, which is incorporated by reference in its entirety. Another example of a pyrolysis process is disclosed in International Publication No. WO 2016/009333 A1, and U.S. patent application Ser. No. 15/085,445 filed on Mar. 30, 2016, each of which is incorporated by reference in its entirety.

A pyrolysis product stream 12 can be recovered as an effluent from the pyrolysis unit 10 and conveyed (e.g., flowed, for example via pumping, gravity, pressure differential, etc.) to the pyrolysis separating unit 20.

The step of converting a plastic waste to a hydrocarbon liquid stream and a first $C_1$ to $C_4$ gas stream in a pyrolysis unit can further comprise separating the pyrolysis product stream 12 in the pyrolysis separating unit 20 into a first $C_1$ to $C_4$ gas stream 22 and a hydrocarbon liquid stream 21, wherein the first $C_1$ to $C_4$ gas stream 22 comprises at least a portion of the gas phase of the pyrolysis product stream 12, and wherein the hydrocarbon liquid stream 21 comprises at least a portion of the liquid phase of the pyrolysis product stream 12. The pyrolysis separating unit 20 may comprise any suitable gas-liquid separator, such as a vapor-liquid separator, oil-gas separators, gas-liquid separators, degassers, deliqulizers, scrubbers, traps, flash drums, compressor suction drums, gravity separators, centrifugal separators, filter vane separators, mist eliminator pads, liquid-gas coalescers, distillation columns, and the like, or combinations thereof.

In some configurations, the pyrolysis separating unit 20 can be a condenser which operates at conditions which condense a portion of the pyrolysis product stream 12 into hydrocarbon liquids (e.g., liquid product) while leaving the hydrocarbon gases in the gas phase (e.g., gas product). A liquid product flows from the pyrolysis separating unit 20 in hydrocarbon liquid stream 21, and a gas product flows from the pyrolysis separating unit 20 in first $C_1$ to $C_4$ gas stream 22.

The first $C_1$ to $C_4$ gas stream 22 can comprise $C_1$ to $C_4$ hydrocarbons, $H_2$, inert gases (e.g., nitrogen ($N_2$), argon, helium, steam, $CO_2$, CO), HCl, and the like, or combinations thereof. The first $C_1$ to $C_4$ gas stream 22 can comprise at least a portion of the chloride of the mixed plastics stream 11.

The first $C_1$ to $C_4$ gas stream 22 can be further introduced to the scrubber 80, as will be described in more detail later herein.

The hydrocarbon liquid stream 21 can comprise paraffins, i-paraffins, olefins, naphthenes, aromatic compounds, organic chlorides, or combinations thereof. When the hydrocarbon liquid stream 21 comprises paraffins, i-paraffins, olefins, naphthenes, and aromatic compounds, the stream can be referred to as a PIONA stream; and when the hydrocarbon liquid stream 21 comprises paraffins, olefins, naphthenes, and aromatic compounds, the stream can be referred to as a PONA stream.

The hydrocarbon liquid stream 21 can comprise one or more chloride compounds (e.g., organic chlorides, such as aliphatic chlorine-containing hydrocarbons, aromatic chlorine-containing hydrocarbons, and other chlorine-containing hydrocarbons) in an amount of less than the chloride amount in the mixed plastics stream 11. The amount of chloride compounds in the hydrocarbon liquid stream 21 may be less than 2,000 ppmw, 1,500 ppmw, 1,000 ppmw, 500 ppmw, 100 ppmw, 50 ppmw, 25 ppmw, or 10 ppmw chloride, based on the total weight of the hydrocarbon liquid stream 21. The amount of chloride compounds in the hydrocarbon liquid stream 21 may equal to or greater than 1 ppmw, 5 ppmw, 10 ppmw, or 20 ppmw chloride, based on the total weight of the hydrocarbon liquid stream 21. A decrease in one or more chloride compounds from the mixed plastics to the hydrocarbon liquid stream is due to dechlorination of the mixed plastics in the pyrolysis unit 10.

As discussed herein, aspects of the processes disclosed herein contemplate hydrocracking of molecules, and in particular, heavy hydrocarbon molecules of the hydrocarbon liquid stream 21. As such, it is contemplated that at least a portion of the hydrocarbon liquid stream 21 comprises heavy hydrocarbon molecules (e.g., also referred to as heavy ends of pyrolysis oils). Hydrocracking of the heavy ends of the pyrolysis oils to meet steam cracker 50 specifications is contemplated. In an aspect, an amount of heavy hydrocarbon molecules in the hydrocarbon liquid stream 21 may be less than 10 wt. %, based on the total weight of the hydrocarbon liquid stream 21. Alternatively, the amount of the heavy hydrocarbon molecules in the hydrocarbon liquid stream 21 may be from 10 wt. % to 90 wt. %, based on the total weight of the hydrocarbon liquid stream 21. As will be described in more detail later herein, the heavy hydrocarbon molecules may include paraffins, i-paraffins, olefins, naphthenes, aromatic hydrocarbons, or combinations thereof. In some aspects, the heavy hydrocarbon molecules may include $C_{16}$ and larger hydrocarbons. Greater than 5, 10, 15, 20, 25, 30 wt. % or more of the heavy hydrocarbon molecules in the hydrocarbon liquid stream 21 is hydrocracked when the hydrocarbon liquid stream 21 is contacted with the first hydroprocessing catalyst in the hydroprocessing unit 30.

Examples of paraffins which may be present in the hydrocarbon liquid stream 21 include, but are not limited to, $C_1$ to $C_{22}$ n-paraffins and i-paraffins. The paraffins can be present in the hydrocarbon liquid stream 21 in an amount of less than 10 wt. % based on the total weight of the hydrocarbon liquid stream 21. Alternatively, the paraffins can be present in the hydrocarbon liquid stream 21 in an amount of 10 wt. %, 20 wt. %, 30 wt. %, 40 wt. %, 50 wt. %, 60 wt. %, or more based on the total weight of the hydrocarbon liquid stream 21. While certain hydrocarbon liquid streams include paraffins of carbon numbers up to 22, the present disclosure is not limited to carbon number 22 as an upper end-point of the suitable range of paraffins, and the paraffins can include higher carbon numbers, e.g., 23, 24, 25, 26, 27, 28, 29, 30, 31, 32, 33, 34, 35, 36, 37, 38, 39, 40, and higher. In some aspects, at least a portion of the paraffins in the hydrocarbon liquid stream 21 comprises at least a portion of the heavy hydrocarbon molecules.

Examples of olefins which may be present in hydrocarbon liquid stream 21 include, but are not limited to, $C_2$ to $C_{10}$ olefins and combinations thereof. Where hydrogen is introduced to the pyrolysis unit 10, due to hydrogenation reactions in the pyrolysis unit 10, the olefins can be present in the hydrocarbon liquid stream 21 in an amount of less than 10 wt. %, based on the total weight of the hydrocarbon liquid stream 21. Alternatively, the olefins can be present in the hydrocarbon liquid stream 21 in an amount of 5 wt. %, 10 wt. %, 20 wt. %, 30 wt. %, 40 wt. %, or more based on the total weight of the hydrocarbon liquid stream 21. While certain hydrocarbon streams include olefins of carbon numbers up to 10, the present disclosure is not limited to carbon number 10 as an upper end-point of the suitable range of olefins, and the olefins can include higher carbon numbers, e.g., 11, 12, 13, 14, 15, 16, 17, 18, 19, 20, 21, 22, 23, 24, 25, 26, 27, 28, 29, 30, and higher. In some aspects, at least a portion of the one or more olefins in the hydrocarbon liquid stream 21 comprise at least a portion of the heavy hydrocarbon molecules. Alternatively, none of the heavy hydrocarbon molecules in the hydrocarbon liquid stream 21 are olefins.

In some aspects, the hydrocarbon liquid stream 21 comprises no olefins, e.g., the hydrocarbon liquid stream 21 is substantially free of olefins. In some aspects, the hydrocarbon liquid stream 21 comprises less than 1, 0.1, 0.01, or 0.001 wt. % olefins.

Examples of naphthenes which may be present in the hydrocarbon liquid stream 21 include, but are not limited to, cyclopentane, cyclohexane, cycloheptane, and cyclooctane. The naphthenes can be present in the hydrocarbon liquid stream 21 in an amount of less than 10 wt. %, based on the total weight of the hydrocarbon liquid stream 21. Alternatively, the naphthenes can be present in the hydrocarbon liquid stream 21 in an amount of 10 wt. %, 20 wt. %, 30 wt. %, 40 wt. %, or more based on the total weight of the hydrocarbon liquid stream 21. While certain hydrocarbon streams include naphthenes of carbon numbers up to 8, the present disclosure is not limited to carbon number 8 as an upper end-point of the suitable range of naphthenes, and the naphthenes can include higher carbon numbers, e.g., 9, 10, 11, 12, 13, 14, 15, 16, 17, 18, 19, 20, 21, 22, 23, 24, 25, 26, 27, 28, 29, 30, and higher. In some aspects, at least a portion of the naphthenes in the hydrocarbon liquid stream 21 comprises at least a portion of the heavy hydrocarbon molecules.

The hydrocarbon liquid stream 21 may comprise aromatic hydrocarbons with carbon numbers of 6, 7, 8, 9, 10, 11, 12, 13, 14, 15, 16, 17, 18, 19, 20, 21, 22, 23, 24, 25, 26, 27, 28, 29, 30, and higher. In an aspect, the aromatic hydrocarbons carbon number can be as high as 22. Nonlimiting examples of aromatic hydrocarbons suitable for use in the present disclosure as part of the hydrocarbon liquid stream include benzene, toluene, xylenes, ethylbenzene, propylbenzenes, trimethylbenzenes, tetramethylbenzenes, butylbenzenes, dimethylnaphthalene, biphenyl, and the like, or combinations thereof. The aromatic hydrocarbons can be present in the hydrocarbon liquid stream 21 in an amount of 5 wt. %, 10 wt. %, 15 wt. %, 20 wt. %, 25 wt. %, 30 wt. %, 35 wt. %, 40 wt. %, 50 wt. %, 60 wt. %, or more based on the total weight of the hydrocarbon liquid stream 21. In some aspects, at least a portion of the aromatic hydrocarbons in the hydrocarbon liquid stream 21 comprises at least a portion of the heavy hydrocarbon molecules.

In some aspects, equal to or greater than about 90 wt. %, alternatively 95 wt. %, or alternatively 99 wt. % of the hydrocarbon liquid stream 21 is characterized by a boiling point of less than about 370° C.

As shown in FIG. 1, at least a portion of the hydrocarbon liquid stream 21 can be conveyed to the hydroprocessing unit 30 to produce a first hydrocarbon product stream 31 and a second $C_1$ to $C_4$ gas stream 32. The hydroprocessing unit 30 can be any suitable hydroprocessing reactor, such as a hydrocracker, a catalytic cracker operated in hydropyrolysis mode, a fluid catalytic cracker operated in hydropyrolysis mode, a hydrotreater, and the like, or combinations thereof. The hydroprocessing unit 30 is configured to hydrocrack long chain molecules (e.g., heavy hydrocarbon molecules contained in the hydrocarbon liquid stream 21), dechlorinate and hydrogenate components of the hydrocarbon liquid stream 21 fed to the hydroprocessing unit 30. In the hydroprocessing unit 30, the hydrocarbon liquid stream 21 is contacted with a first hydroprocessing catalyst in the presence of hydrogen to yield the first hydrocarbon product stream 31. It is contemplated that the hydrocarbon liquid stream 21 may be contacted with the first hydroprocessing catalyst in upward flow, downward flow, radial flow, or combinations thereof, with or without a staged addition of hydrocarbon liquid stream 21, a $H_2$ stream, or combinations thereof.

The hydroprocessing unit 30 may be any vessel configured to contain the first hydroprocessing catalyst disclosed herein. The vessel may be configured for gas phase, liquid phase, vapor-liquid phase, gas-liquid-solid phase, or slurry phase operation. The hydroprocessing unit 30 may include one or more beds of the first hydroprocessing catalyst in fixed bed, fluidized bed, moving bed, ebullated bed, slurry bed, or combinations thereof, configuration. The hydroprocessing unit 30 may be operated adiabatically, isothermally, nonadiabatically, non-isothermally, or combinations thereof. In an aspect, the hydroprocessing unit 30 may comprise one or more vessels.

The hydroprocessing unit 30 may facilitate any reaction of the components of the hydrocarbon liquid stream 21 in the presence of, or with, hydrogen. Reactions may occur as the addition of hydrogen atoms to double bonds of unsaturated molecules (e.g., olefins, aromatic compounds), resulting in saturated molecules (e.g., paraffins, i-paraffins, naphthenes). Additionally, reactions in the hydroprocessing unit 30 may cause a rupture of a bond of an organic compound, resulting in "cracking" of a hydrocarbon molecule into two or more smaller hydrocarbon molecules, or resulting in a subsequent reaction and/or replacement of a heteroatom with hydrogen. Examples of reactions which may occur in the hydroprocessing unit 30 include, but are not limited to, the hydrogenation of olefins, removal of heteroatoms from heteroatom-containing hydrocarbons (e.g., dechlorination), hydrocracking of large paraffins or i-paraffins to smaller hydrocarbon molecules, hydrocracking of aromatic hydrocarbons to smaller cyclic or acyclic hydrocarbons, conversion of one or more aromatic compounds to one or more cycloparaffins, isomerization of one or more normal paraffins to one or more i-paraffins, selective ring opening of one or more cycloparaffins to one or more i-paraffins, or combinations thereof.

In an aspect, contacting the hydrocarbon liquid stream 21 with the first hydroprocessing catalyst in the presence of hydrogen yields $C_1$ to $C_4$ gases and $C_5+$ ($C_5$ and heavier) liquid hydrocarbons. It is contemplated that dechlorination using the first hydroprocessing catalyst as described herein is performed in the hydroprocessing unit 30 without the use of chlorine sorbents, without addition of $Na_2CO_3$ in an effective amount to function as a dechlorinating agent, or both.

The first hydroprocessing catalyst may be any catalyst used for hydrogenation (e.g., saturation) of olefins and aromatic hydrocarbons (e.g., a commercially available hydrotreating catalyst). The first hydroprocessing catalyst can comprise a cobalt and molybdenum catalyst (Co—Mo catalyst) on an alumina support, a nickel and molybdenum catalyst (Ni—Mo catalyst) on an alumina support, a tungsten and molybdenum catalyst (W—Mo catalyst) on an alumina support, cobalt and molybdenum oxides on an alumina support, nickel and molybdenum oxides on an alumina support, tungsten and molybdenum oxides on an alumina support, cobalt and molybdenum sulphides on an alumina support, nickel and molybdenum sulphides on an alumina support, tungsten and molybdenum sulphides on an alumina support, a zeolite comprising one or more metals, and the like, or combinations thereof. Other catalysts suitable for use as the first hydroprocessing catalyst may include platinum and palladium catalyst (Pt—Pd catalyst) on an alumina support, nickel sulphides suitable for slurry processing, molybdenum sulphides suitable for slurry processing, and the like, or combinations thereof. The zeolites can comprise ZSM-5, ZSM-11, Y, high-silica Y, USY, and the like, or combinations thereof. Each metal of the one or more metals of the zeolite can be independently selected from the group consisting of cobalt, molybdenum, tungsten, nickel, titanium, copper, magnesium, tin, iron, zinc, tungsten, vanadium, gallium, calcium, manganese, ruthenium and rhenium.

In configurations where the hydrocarbon liquid stream 21 comprises one or more sulphides and one or more chloride compounds, contacting the hydrocarbon liquid stream 21 with the first hydroprocessing catalyst acts to activate the first hydroprocessing catalyst by sulphiding and to acidify the first hydroprocessing catalyst by chlorinating. Continuously contacting the first hydroprocessing catalyst with the hydrocarbon liquid stream 21 containing one or more sulphides, one or more chloride compounds, or both, may maintain catalyst activity on a continuous basis. For purposes of the disclosure herein, the term "catalyst activity" or "catalytic activity" with respect to the first hydroprocessing catalyst refers to the ability of the first hydroprocessing catalyst to catalyze hydroprocessing reactions, such as hydrocracking reactions, hydrodechlorination reactions, etc.

The first hydroprocessing catalyst can be activated (e.g., chlorided and sulphided) in-situ and/or ex-situ by contacting the first hydroprocessing catalyst with a stream (e.g., hydrocarbon liquid stream 21, a doping stream, a catalyst activating stream, etc.) containing sulphides and/or chlorides.

Chloriding the first hydroprocessing catalyst results in a first hydroprocessing catalyst which has hydrocracking sites (chlorided alumina) for hydrocracking components of the hydrocarbon liquid stream 21.

Sulphiding and maintaining the first hydroprocessing catalyst in sulphided form result in a first hydroprocessing catalyst which has hydrogenation sites (sulphided metal) for hydrogenation of components of the hydrocarbon liquid stream 21. In an aspect, the one or more sulphides can be contained in and/or added to the hydrocarbon liquid stream 21 in an amount effective to provide for a sulphur content of the hydrocarbon liquid stream 21 of from about 0.05 wt. % to about 5 wt. %, alternatively from about 0.1 wt. % to about 4.5 wt. %, or alternatively from about 0.5 wt. % to about 4 wt. %, based on the total weight of the hydrocarbon liquid stream 21. At least a portion of the sulphur present in the hydroprocessing unit 30 is removed as $H_2S$ in the second $C_1$ to $C_4$ gas stream 32 to provide a reduced level of sulphur acceptable for downstream processing in steam crackers and refinery units.

A $H_2$ containing stream can be added to the hydrocarbon liquid stream 21 before entering the hydroprocessing unit 30. Additionally or alternatively, a $H_2$ containing stream can be added to the hydroprocessing unit 30 to enrich the hydroprocessing unit environment with $H_2$, for example via a $H_2$ containing stream fed directly to the hydroprocessing unit independently of the hydrocarbon liquid stream 21, and/or $H_2$ added to the hydrocarbon liquid stream 21 fed to the hydroprocessing unit. The rate of hydrogen addition to the hydroprocessing unit 30 is generally sufficient to achieve the hydrogen to hydrocarbon ratios disclosed herein.

The disclosed hydroprocessing unit 30 may operate at various process conditions. For example, contacting the hydrocarbon liquid stream 21 with the first hydroprocessing catalyst in the presence of hydrogen may occur in the hydroprocessing unit 30 at a temperature of from 100° C. to 500° C.; alternatively, 125° C. to 450° C.; or alternatively, 200° C. to 400° C. The temperature in the hydroprocessing unit 30 can be attained by using a feed (e.g., hydrocarbon liquid stream 21) pre-heating furnace and/or feed-hydroprocessing unit effluent heat exchangers. Contacting the hydrocarbon liquid stream 21 with the first hydroprocessing catalyst in the presence of hydrogen may occur in the hydroprocessing unit 30 at a pressure of 1 barg to 200 barg, alternatively, 10 barg to 150 barg, or alternatively, 20 barg to 60 barg. Contacting the hydrocarbon liquid stream 21 with the first hydroprocessing catalyst in the presence of hydrogen may occur in the hydroprocessing unit 30 at a weight hourly space velocity (WHSV) of between 0.1 $hr^{-1}$ to 10 $hr^{-1}$; or alternatively, 1 $hr^{-1}$ to 3 $hr^{-1}$. Contacting the hydrocarbon liquid stream 21 with the first hydroprocessing catalyst in the presence of hydrogen may occur in the hydroprocessing unit 30 at a hydrogen to hydrocarbon ($H_2$/HC) flow ratio of from 10 NL/L to 3,000 NL/L; or alternatively, from 200 NL/L to 800 NL/L.

In some configurations, the hydroprocessing unit 30 can be a mild hydrocracker used in refining operations, wherein the hydroprocessing unit 30 can operate at pressures of up to 100 barg and at temperatures of up to 430° C. As will be appreciated by one of skill in the art, and with the help of this disclosure, the hydroprocessing unit 30 could operate at lower pressures to economize on hydrogen consumption and to preserve mono-ring aromatics (and only saturate di- and poly-aromatics, and olefins). As will be appreciated by one of skill in the art, and with the help of this disclosure, since plastic pyrolysis oils are rich in hydrogen content compared to petroleum residues, it is possible to carry out the hydroprocessing at lower pressures of less than 100 barg. Further, as will be appreciated by one of skill in the art, and with the help of this disclosure, higher pressures of more than 100 barg can also be used with plastic pyrolysis oils.

The second $C_1$ to $C_4$ gas stream 32 can comprise $C_1$ to $C_4$ hydrocarbons, $H_2$, inert gases (e.g., nitrogen ($N_2$), argon, helium, steam), $H_2S$, HCl, and the like, or combinations thereof. The second $C_1$ to $C_4$ gas stream 32 can comprise at least a portion of the chloride of the hydrocarbon liquid stream 21. The second $C_1$ to $C_4$ gas stream 32 can comprise at least a portion of the sulphur of the hydrocarbon liquid stream 21.

The second $C_1$ to $C_4$ gas stream 32 can be further introduced to the scrubber 80, as will be described in more detail later herein.

The first hydrocarbon product stream 31 can be recovered as an effluent from the hydroprocessing unit 30 and conveyed (e.g., flowed) to the first separating unit 40. The first hydrocarbon product 31 comprises $C_5$+ liquid hydrocarbons, wherein the $C_5$+ liquid hydrocarbons comprise heavy hydrocarbon molecules. An amount of heavy hydrocarbon molecules in the first hydrocarbon product 31 is less than an amount of heavy hydrocarbon molecules in the hydrocarbon liquid stream 21 due to hydrocracking of at least a portion of heavy hydrocarbon molecules from the hydrocarbon liquid stream during the step of contacting the hydrocarbon liquid stream 21 with a first hydroprocessing catalyst in the presence of hydrogen in the hydroprocessing unit 30.

The first separating unit 40 can comprise any suitable separating unit that is configured to separate the first hydrocarbon product 31 into a treated hydrocarbon stream 41 and a first heavies stream 42, wherein the treated hydrocarbon stream 41 comprises $C_5$ to $C_8$ hydrocarbons, and wherein the first heavies stream 42 comprises $C_9$+ hydrocarbons. For example, the first separating unit 40 can comprise one or more distillation columns. Generally, the one or more distillation columns can separate components of the first hydrocarbon product 31 based on their boiling points, and ability to form azeotropes. For example, a lower boiling point fraction comprising $C_5$ to $C_8$ hydrocarbons can be recovered at a top of a distillation column as the treated hydrocarbon stream 41, while a higher boiling point fraction comprising $C_9$+ hydrocarbons can be recovered at a bottom of a distillation column as the first heavies stream 42.

The treated hydrocarbon stream 41 can comprise $C_5$ to $C_8$ hydrocarbons, wherein the $C_5$ to $C_8$ hydrocarbons comprise $C_5$ to $C_8$ aromatic hydrocarbons, such as benzene, toluene, xylenes (BTX), and ethyl benzene (EB), as well as $C_5$ to $C_8$ paraffins, $C_5$ to $C_8$ i-paraffins and $C_5$ to $C_8$ naphthenes.

The treated hydrocarbon stream 41 can be characterized by a boiling point that is lower than the boiling point of the hydrocarbon liquid stream 21 and/or a boiling point of the first hydrocarbon product stream 31. In some aspects, equal to or greater than about 97 wt. %, alternatively 98 wt. %, or alternatively 99.9 wt. % of the treated hydrocarbon stream 41 is characterized by a boiling point of less than about 370° C., or alternatively less than about 350° C.

The treated hydrocarbon stream 41 can be characterized by an olefin content that is lower than an olefin content of the hydrocarbon liquid stream 21. In some aspects, the treated hydrocarbon stream 41 can be characterized by an olefin content of less than about 1, 0.1, 0.01, or 0.001 wt. % olefins, based on the total weight of the treated hydrocarbon stream 41.

The treated hydrocarbon stream 41 can be characterized by a chloride content that is lower than a chloride content of the hydrocarbon liquid stream 21, wherein a decrease in chloride content results from dehydrochlorination of the hydrocarbon liquid stream 21 during the step of contacting the hydrocarbon liquid stream 21 with a first hydroprocessing catalyst in the presence of hydrogen in the hydroprocessing unit 30. The treated hydrocarbon stream 41 can comprise one or more chloride compounds in an amount of less than about 10 ppmw chloride, alternatively less than about 5 ppmw chloride, or alternatively less than about 3 ppmw chloride, based on the total weight of the treated hydrocarbon stream 41.

In some aspects the treated hydrocarbon stream 41 can be introduced to the steam cracker 50, as will be described in more detail later herein. In other aspects, the treated hydrocarbon stream 41 can be introduced to steam cracker 50 after recovery of $C_6$-$C_8$ aromatics in an aromatics separation unit.

The first heavies stream 42 can be characterized by a boiling point that is greater than the boiling point of the first hydrocarbon product stream 31. The first heavies stream 42 can comprise $C_9$+ aromatic hydrocarbons (e.g., alkylated aromatics), $C_9$+ paraffins, $C_9$+ i-paraffins, $C_9$+ naphthenes, etc.

The first heavies stream 42 can be characterized by an olefin content that is lower than an olefin content of the hydrocarbon liquid stream 21. In some aspects, the first heavies stream 42 can be characterized by an olefin content of less than about 1, 0.1, 0.01, or 0.001 wt. % olefins, based on the total weight of the first heavies stream 42.

The first heavies stream 42 can be characterized by a chloride content that is lower than a chloride content of the hydrocarbon liquid stream 21, wherein a decrease in chloride content results from dehydrochlorination of the hydrocarbon liquid stream 21 during the step of contacting the hydrocarbon liquid stream 21 with a first hydroprocessing catalyst in the presence of hydrogen in the hydroprocessing unit 30. The first heavies stream 42 can comprise one or more chloride compounds in an amount of less than about 10 ppmw chloride, alternatively less than about 5 ppmw chloride, or alternatively less than about 3 ppmw chloride, based on the total weight of the first heavies stream 42.

In some configurations, a portion 42a of the first heavies stream 42 can be conveyed to the hydroprocessing unit 30. Without wishing to be limited by theory, introducing a portion of the first heavies stream to the hydroprocessing unit can increase a steam cracker olefins yield, while decreasing a steam cracker aromatics yield, owing to a lower amount of the first heavies stream being converted to $C_6$ to $C_8$ aromatic hydrocarbons in the hydrodealkylating unit.

As shown in FIG. 1, at least a portion of the first heavies stream 42 can be conveyed to the hydrodealkylating unit 60 to produce a second hydrocarbon product stream 61 and a third $C_1$ to $C_4$ gas stream 62. The hydrodealkylating unit 60 can be any suitable hydroprocessing reactor, such as a hydrocracker, a catalytic cracker operated in hydropyrolysis mode, a fluid catalytic cracker operated in hydropyrolysis mode, a hydrotreater, a hydrodealkylating reactor, and the like, or combinations thereof. The hydrodealkylating unit 60 is configured to hydrodealkylate, and in some configurations, additionally hydrocrack, dechlorinate and hydrogenate components of the first heavies stream 42 fed to the hydrodealkylating unit 60. In the hydrodealkylating unit 60, the first heavies stream 42 is contacted with a second hydroprocessing catalyst in the presence of hydrogen to yield the second hydrocarbon product stream 61. It is contemplated that the first heavies stream 42 may be contacted with the second hydroprocessing catalyst in upward flow, downward flow, radial flow, or combinations thereof, with or without a staged addition of first heavies stream 42, a $H_2$ stream, or combinations thereof.

The hydrodealkylating unit 60 may be any vessel configured to contain the second hydroprocessing catalyst disclosed herein. The vessel may be configured for gas phase, liquid phase, vapor-liquid phase, gas-solid phase, gas-liquid-solid phase, or slurry phase operation. The hydrodealkylating unit 60 may include one or more beds of the second hydroprocessing catalyst in fixed bed, fluidized bed, moving bed, ebullated bed, slurry bed, or combinations thereof, configuration. The hydrodealkylating unit 60 may be operated adiabatically, isothermally, nonadiabatically, non-isothermally, or combinations thereof. In an aspect, the hydrodealkylating unit 60 may comprise one or more vessels.

The hydrodealkylating unit 60 may facilitate any suitable reaction of the components of the first heavies stream 42 in the presence of, or with, hydrogen. Reactions in the hydrodealkylating unit 60 include a hydrodealkylation reaction of $C_9+$ aromatic hydrocarbons, wherein the $C_9+$ aromatic hydrocarbons in the presence of hydrogen form lower molecular weight aromatic hydrocarbons (e.g., $C_{6-8}$ aromatic hydrocarbons) and alkanes. For example, trimethylbenzenes can undergo a hydrodealkylation reaction to produce xylenes and methane. Other reactions may occur in the hydrodealkylating unit 60, such as the addition of hydrogen atoms to double bonds of unsaturated molecules (e.g., olefins, aromatic compounds), resulting in saturated molecules (e.g., paraffins, i-paraffins, naphthenes). Additionally, reactions in the hydrodealkylating unit 60 may cause a rupture of a bond of an organic compound, resulting in "cracking" of a hydrocarbon molecule into two or more smaller hydrocarbon molecules, or resulting in a subsequent reaction and/or replacement of a heteroatom with hydrogen. Examples of reactions which may occur in the hydrodealkylating unit 60 include, but are not limited to, hydrodealkylation of $C_9+$ aromatic hydrocarbons, the hydrogenation of olefins, removal of heteroatoms from heteroatom-containing hydrocarbons (e.g., dechlorination), hydrocracking of large paraffins or i-paraffins to smaller hydrocarbon molecules, hydrocracking of aromatic hydrocarbons to smaller cyclic or acyclic hydrocarbons, conversion of one or more aromatic compounds to one or more cycloparaffins, isomerization of one or more normal paraffins to one or more i-paraffins, selective ring opening of one or more cycloparaffins to one or more i-paraffins, or combinations thereof.

The second hydroprocessing catalyst may be any suitable catalyst used for hydrogenation (e.g., saturation) of olefins and aromatic hydrocarbons (e.g., a commercially available hydrotreating catalyst), such as the catalyst described for the first hydroprocessing catalyst. Additionally, the second hydroprocessing catalyst may be any suitable hydrodealkylation catalyst (e.g., a commercially available hydrodealkylation catalyst), such as chromium oxides on an alumina support, chromium oxides on a silica support, molybdenum oxides on an alumina support, molybdenum oxides on a silica support, platinum on an alumina support, platinum on a silica support, platinum oxides on an alumina support, platinum oxides on a silica support, and the like, or combinations thereof. The first hydroprocessing catalyst and the second hydroprocessing catalyst can be the same or different.

In configurations where first heavies stream 42 comprises one or more sulphides and one or more chloride compounds, contacting the first heavies stream 42 with the second hydroprocessing catalyst acts to activate the second hydroprocessing catalyst by sulphiding and to acidify the second hydroprocessing catalyst by chlorinating. Continuously contacting the second hydroprocessing catalyst with the first heavies stream 42 containing one or more sulphides, one or more chloride compounds, or both, may maintain catalyst activity on a continuous basis. For purposes of the disclosure herein, the term "catalyst activity" or "catalytic activity" with respect to the second hydroprocessing catalyst refers to the ability of the second hydroprocessing catalyst to catalyze hydroprocessing reactions, such as hydrodealkylation reactions, hydrocracking reactions, hydrodechlorination reactions, etc.

The second hydroprocessing catalyst can be activated (e.g., chlorided and sulphided) in-situ and/or ex-situ by contacting the second hydroprocessing catalyst with a stream (e.g., first heavies stream 42, a doping stream, a catalyst activating stream, etc.) containing sulphides and/or chlorides.

Chloriding the second hydroprocessing catalyst results in a second hydroprocessing catalyst which has hydrocracking sites (chlorided alumina) for hydrocracking components of the first heavies stream 42.

Sulphiding and maintaining the second hydroprocessing catalyst in sulphided form result in a second hydroprocessing catalyst which has hydrogenation sites (sulphided metal) for hydrogenation of components of the first heavies stream 42. In an aspect, the one or more sulphides can be contained in and/or added to the first heavies stream 42 in an amount effective to provide for a sulphur content of the first heavies stream 42 of from about 0.05 wt. % to about 5 wt. %, alternatively from about 0.1 wt. % to about 4.5 wt. %, or alternatively from about 0.5 wt. % to about 4 wt. %, based on the total weight of the first heavies stream 42. At least a portion of the sulphur present in the hydrodealkylating unit 60 is removed as $H_2S$ in the third $C_1$ to $C_4$ gas stream 62 to provide a reduced level of sulphur acceptable for downstream processing in steam crackers and refinery units.

A hydrogen containing stream can be added to the first heavies stream 42 before entering the hydrodealkylating unit 60. Additionally or alternatively, a hydrogen containing stream can be added to the hydrodealkylating unit 60 to enrich the hydroprocessing unit environment with hydrogen, for example via a hydrogen containing stream fed directly to the hydrodealkylating unit independently of the first heavies stream 42. The rate of hydrogen addition to the hydrodealkylating unit 60 is generally sufficient to achieve the hydrogen to hydrocarbon ratios disclosed herein.

The disclosed hydrodealkylating unit 60 may operate at various process conditions. For example, contacting the first heavies stream 42 with the second hydroprocessing catalyst in the presence of hydrogen may occur in the hydrodealkylating unit 60 at a temperature of from 100° C. to 500° C.; alternatively, 125° C. to 450° C.; or alternatively, 200° C. to 400° C. Contacting the first heavies stream 42 with the second hydroprocessing catalyst in the presence of hydrogen may occur in the hydrodealkylating unit 60 at a pressure of 1 barg to 100 barg, alternatively, 10 barg to 60 barg, or alternatively, 20 barg to 50 barg. Contacting the first heavies stream 42 with the second hydroprocessing catalyst in the presence of hydrogen may occur in the hydrodealkylating unit 60 at a WHSV of between 0.1 $hr^{-1}$ to 10 $hr^{-1}$; or alternatively, 1 $hr^{-1}$ to 3 $hr^{-1}$. Contacting the first heavies stream 42 with the second hydroprocessing catalyst in the presence of hydrogen may occur in the hydrodealkylating unit 60 at a hydrogen to hydrocarbon ($H_2$/HC) flow ratio of from 10 NL/L to 3,000 NL/L; or alternatively, from 200 NL/L to 800 NL/L.

The third $C_1$ to $C_4$ gas stream 62 can comprise $C_1$ to $C_4$ hydrocarbons, $H_2$, inert gases (e.g., nitrogen ($N_2$), argon, helium, steam), $H_2S$, HCl, and the like, or combinations thereof. The third $C_1$ to $C_4$ gas stream 62 can comprise at least a portion of the chloride of the first heavies stream 42. The third $C_1$ to $C_4$ gas stream 62 can comprise at least a portion of the sulphur of the first heavies stream 42.

The third $C_1$ to $C_4$ gas stream 62 can be further introduced to the scrubber 80, as will be described in more detail later herein.

In some configurations of the mixed plastics processing system 100, at least a portion of the first $C_1$ to $C_4$ gas stream 22, at least a portion of the second $C_1$ to $C_4$ gas stream 32, at least a portion of the third $C_1$ to $C_4$ gas stream 62, or combinations thereof can be introduced to a scrubber 80 (e.g., an acid gas scrubber) to produce a treated $C_1$ to $C_4$ gas stream 81, wherein an amount of acid gases (e.g., $H_2S$, HCl, CO, $CO_2$, etc.) in the treated $C_1$ to $C_4$ gas stream 81 is less than an amount of acid gases in the first $C_1$ to $C_4$ gas stream 22, the second $C_1$ to $C_4$ gas stream 32, the third $C_1$ to $C_4$ gas stream 62, or combinations thereof, respectively.

Generally, the treated $C_1$ to $C_4$ gas stream 81 can comprise hydrogen methane, ethane, ethylene, propane, propylene, butanes, butylenes, butadiene, and the like, or combinations thereof.

The scrubber 80 can contain a caustic solution (e.g., a solution of sodium hydroxide and/or potassium hydroxide in water) which can remove (e.g., via reaction, adsorption, absorption, or combinations thereof) at least a portion of acid gases from the at least a portion of the first $C_1$ to $C_4$ gas stream 22, at least a portion of the second $C_1$ to $C_4$ gas stream 32, at least a portion of the third $C_1$ to $C_4$ gas stream 62, or combinations thereof to yield a treated $C_1$ to $C_4$ gas stream 81. At least a portion of the treated $C_1$ to $C_4$ gas stream 81 can be further contacted with a chloride adsorber to remove any remaining chloride from the treated $C_1$ to $C_4$ gas stream 81, for example in optional chloride adsorber unit 85 which may comprise the chloride adsorber. Nonlimiting examples of chloride adsorbers suitable for use in the present disclosure include attapulgite, activated carbon, dolomite, bentonite, iron oxide, goethite, hematite, magnetite, alumina, gamma alumina, silica, aluminosilicates, ion exchange resins, hydrotalcites, spinels, copper oxides, zinc oxide, sodium oxide, calcium oxide, magnesium oxide, metal loaded zeolites, molecular sieve 13X, and the like, or combinations thereof.

Due to hydrodealkylation reactions in the hydrodealkylating unit 60, an amount of $C_9$+ aromatic hydrocarbons in the second hydrocarbon product stream 61 is less than an amount of $C_9$+ aromatic hydrocarbons in the first heavies stream 42. The second hydrocarbon product stream 61 may contain $C_9$+ aromatic hydrocarbons in an amount of less than 30 wt. %, based on the total weight of the second hydrocarbon product stream 61. As will be appreciated by one of skill in the art, and with the help of this disclosure, a decrease in the amount of $C_9$+ aromatic hydrocarbons between the first heavies stream 42 and the second hydrocarbon product stream 61 is also due to hydrocracking reactions, as well as hydrogenation reactions that the $C_9$+ aromatic hydrocarbons participate in the hydrodealkylating unit 60, in addition to hydrodealkylation reactions that the $C_9$+ aromatic hydrocarbons participate in the hydrodealkylating unit 60.

Further, the second hydrocarbon product stream 61 may contain an amount of $C_{6-8}$ aromatic hydrocarbons that is greater than an amount of $C_{6-8}$ aromatic hydrocarbons in the first heavies stream 42. The amount of $C_6$ to $C_8$ aromatic hydrocarbons in the second hydrocarbon product stream 61 is increased by equal to or greater than about 1 wt. %, when compared to the amount of $C_6$ to $C_8$ aromatic hydrocarbons in the first heavies stream 42, and wherein an increase in the amount $C_6$ to $C_8$ aromatic hydrocarbons is due to hydrodealkylating of at least a portion of $C_9$+ aromatic hydrocarbons from the first heavies stream 42 during the step of contacting the first heavies stream 42 with the second hydroprocessing catalyst in the presence of hydrogen in the hydrodealkylating unit 60.

It is contemplated that a total amount of aromatic hydrocarbons in the second hydrocarbon product stream 61 is less than a total amount of aromatic hydrocarbons in the first heavies stream 42 due to hydrogenation and/or hydrocracking of at least a portion of the aromatic hydrocarbons in the hydrodealkylating unit 60, although at least a portion of the $C_9$+ aromatic hydrocarbons is hydrodealkylated to produce $C_{6-8}$ aromatic hydrocarbons. As will be appreciated by one of skill in the art, and with the help of this disclosure, as $C_{6-8}$ aromatic hydrocarbons are produced by the hydrodealkylation reactions, a portion of the $C_{6-8}$ aromatic hydrocarbons present in the hydrodealkylating unit 60 (whether produced via hydrodealkylation or introduced via the first heavies stream 42) will undergo hydrogenation and/or hydrocracking.

Further, due to hydrogenation reactions in the hydrodealkylating unit 60, the second hydrocarbon product stream 61 may contain one or more olefins in an amount of less than 1 wt. %, based on the total weight of the second hydrocarbon product stream 61.

The second hydrocarbon product stream 61 can comprise $C_5$+ liquid hydrocarbons, such as $C_5$ to $C_8$ hydrocarbons and $C_9$+ hydrocarbons. At least a portion of the second hydrocarbon product stream 61 can be introduced to the first separating unit 40 to produce the treated hydrocarbon stream 41 comprising $C_5$ to $C_8$ hydrocarbons, and the first heavies stream 42 comprising $C_9$+ hydrocarbons.

In some configurations, a portion 61a of the second hydrocarbon product stream 61 can be conveyed to the hydroprocessing unit 30.

As shown in FIG. 1, at least a portion of the treated hydrocarbon stream 41 can be fed to the steam cracker 50, wherein the treated hydrocarbon stream 41 meets steam cracker feed requirements for chloride content, olefin content, and boiling end point. Generally, steam cracking is a process in which saturated hydrocarbons are broken down into smaller, often unsaturated, hydrocarbons (i.e., olefins). In steam cracking, a hydrocarbon feed stream, such as the treated hydrocarbon stream 41, can be diluted with steam and briefly heated in a furnace or cracker, such as steam cracker 50, in the absence of oxygen. Typically, a steam cracking reaction temperature is very high, at around 800° C. or more, and residence times can be short (e.g., on the order of milliseconds) to improve yield. After reaching the cracking temperature, the cracked gas mixture can be quickly quenched to stop the reaction, for example in a transfer line heat exchanger or inside a quenching header using quench oil.

Steam cracker 50 generally has feed specification requirements, e.g., requires a dechlorinated feed with low chloride content, a low olefin content and with a specific boiling end point or boiling point distribution.

The steam cracker 50 cracks molecules or cleaves at elevated temperatures carbon-carbon bonds of the components in the treated hydrocarbon stream 41 in the presence of steam to yield high value products.

A steam cracker product stream 51 comprising high value products can be recovered from the steam cracker 50 wherein the high value product comprises ethylene, propylene, butylenes, butadiene, aromatic compounds, and the like, or combinations thereof.

The steam cracker product stream 51 can be characterized by an olefin content that is greater than an olefin content of the treated hydrocarbon stream 41. In some aspects, the steam cracker product stream 51 can be characterized by an olefin content of equal to or greater than about 50 wt. % olefins, based on the total weight of the steam cracker product stream 51.

At least a portion of the steam cracker product stream 51 and/or at least a portion of the treated $C_1$ to $C_4$ gas stream 81 can be introduced to the second separating unit 70 to produce an olefin gas stream 71, a saturated hydrocarbons gas stream 72, an aromatics stream 73, and a second heavies stream 74; wherein the olefin gas stream 71 comprises ethylene, propylene, butylenes, butadiene, or combinations thereof; wherein the saturated hydrocarbons gas stream 72 comprises methane, ethane, propane, butanes, hydrogen, or combinations thereof; wherein the aromatics stream 73 comprises $C_6$ to $C_8$ aromatic hydrocarbons; and wherein the second heavies stream 74 comprises $C_{5+}$ hydrocarbons other than $C_6$ to $C_8$ aromatic hydrocarbons (e.g., $C_{5+}$ hydrocarbons exclude $C_6$ to $C_8$ aromatic hydrocarbons). In some configurations, the second separating unit 70 can comprise a plurality of distillation columns.

An amount of $C_6$ to $C_8$ aromatic hydrocarbons in the aromatics stream 73 is greater than an amount of $C_6$ to $C_8$ aromatic hydrocarbons in the second hydrocarbon product stream 61. As will be appreciated by one of skill in the art, and with the help of this disclosure, the second hydrocarbon product stream 61 also contains $C_9+$ hydrocarbons produced in the hydrodealkylating unit 60, while the aromatics stream 73 has a much lower content of $C_9+$ hydrocarbons, as the majority of the $C_9+$ hydrocarbons introduced to the second separating unit 70 are recovered in the second heavies stream 74. The amount of $C_6$ to $C_8$ aromatic hydrocarbons in a particular stream refers to a weight % of the $C_6$ to $C_8$ aromatic hydrocarbons in that particular stream, based upon the total weight of that particular steam.

In an aspect, at least a portion of the second heavies stream 74 can be conveyed to the hydroprocessing unit 30. In some configurations, a portion 74a of the second heavies stream 74 can be conveyed to the hydrodealkylating unit 60.

A $C_9+$ hydrocarbons content of a combination of the olefin gas stream 71, saturated hydrocarbons gas stream 72, and aromatics stream 73 is less than about 5 wt. %, alternatively less than about 3 wt. %, or alternatively less than about 1 wt. %, based on the weight of the combination of the olefin gas stream 71, saturated hydrocarbons gas stream 72, and aromatics stream 73. As will be appreciated by one of skill in the art, and with the help of this disclosure, the mixed plastics processing system 100 is configured to recycle heavy streams, such as streams containing $C_9+$ hydrocarbons, almost to extinction, in order to maximize recovery of $C_6$ to $C_8$ aromatic hydrocarbons in the range of $C_6+$ recovered hydrocarbons. The second separating unit 70 can comprise an aromatics extraction unit for recovering $C_6$ to $C_8$ aromatic hydrocarbons.

A process for processing plastic waste can comprise (a) converting a plastic waste to a hydrocarbon liquid stream and a first $C_1$ to $C_4$ gas stream in a pyrolysis unit, wherein the plastic waste comprises equal to or greater than about 400 ppmw polyvinylchloride and/or polyvinylidene chloride, based on the total weight of the plastic waste; (b) contacting at least a portion of the hydrocarbon liquid stream with a first hydroprocessing catalyst in the presence of hydrogen in a hydroprocessing unit at a temperature of from about 300° C. to about 500° C. and a pressure of from about 1 barg to about 60 barg to yield a first hydrocarbon product and a second $C_1$ to $C_4$ gas stream, wherein the first hydrocarbon product comprises $C_5+$ liquid hydrocarbons; (c) introducing at least a portion of the first hydrocarbon product to a first separating unit comprising a distillation column to produce a treated hydrocarbon stream and a first heavies stream, wherein the treated hydrocarbon stream comprises $C_5$ to $C_8$ hydrocarbons, wherein the treated hydrocarbon stream comprises one or more chloride compounds an amount of less than about 10 ppmw chloride, based on the total weight of the treated hydrocarbon stream, wherein the treated hydrocarbon stream comprises olefins in an amount of less than about 1 wt. %, based on the total weight of the treated hydrocarbon stream, wherein the treated hydrocarbon stream is characterized by a boiling end point of less than about 370° C., and wherein the first heavies stream comprises $C_9+$ hydrocarbons; (d) contacting at least a portion of the first heavies stream with a hydrodealkylating catalyst in the presence of hydrogen in a hydrodealkylating unit at a temperature of from about 300° C. to about 500° C. and a pressure of from about 20 barg to about 40 barg to yield a second hydrocarbon product and a third $C_1$ to $C_4$ gas stream, wherein the second hydrocarbon product comprises $C_5+$ liquid hydrocarbons, and wherein an amount of $C_6$ to $C_8$ aromatic hydrocarbons in the second hydrocarbon product is greater than an amount of $C_6$ to $C_8$ aromatic hydrocarbons in the first heavies stream; (e) conveying at least a portion of the second hydrocarbon product to the first separating unit; (f) feeding at least a portion of the treated hydrocarbon stream and steam to a steam cracker to produce a steam cracker product stream, wherein the steam cracker requires (i) an amount of chloride in a feed stream to the steam cracker to be less than 10 ppmw chloride, based on the total weight of the feed stream, (ii) an amount of olefins in a feed stream to the steam cracker to be less than 1 wt. % olefins, based on the total weight of the feed stream, and (iii) a boiling end point of a feed stream to the steam cracker to be less than about 370° C., and wherein an amount of olefins in the steam cracker product stream is greater than an amount of olefins in the treated hydrocarbon stream; (g) introducing at least a portion of the steam cracker product stream to a second separating unit to produce an olefin gas stream, a saturated hydrocarbons gas stream, an aromatics stream, and a second heavies stream; wherein the olefin gas stream comprises ethylene, propylene, butylenes, butadiene, or combinations thereof; wherein the saturated hydrocarbons gas stream contains methane, ethane, propane, butanes, hydrogen, or combinations thereof; wherein the aromatics stream comprises $C_6$ to $C_8$ aromatic hydrocarbons; and wherein the second heavies stream comprises $C_{5+}$ hydrocarbons other than $C_6$ to $C_8$ aromatic hydrocarbons; and (h) conveying at least a portion of the second heavies stream to the hydroprocessing unit.

A system for processing plastic waste can comprise a pyrolysis unit, a hydroprocessing unit, a first separating unit, a hydrodealkylating unit, a steam cracker, and a second separating unit; wherein the pyrolysis unit is configured to receive a plastic waste and to produce a hydrocarbon liquid stream and a first $C_1$ to $C_4$ gas stream, wherein the plastic waste comprises equal to or greater than about 400 ppmw polyvinylchloride and/or polyvinylidene chloride, based on the total weight of the plastic waste; wherein the hydroprocessing unit comprises a first hydroprocessing catalyst, wherein the hydroprocessing unit is configured to receive hydrogen and at least a portion of the hydrocarbon liquid stream and to operate at a temperature of from about 300° C. to about 500° C. and a pressure of from about 1 barg to about 60 barg to produce a first hydrocarbon product and a second $C_1$ to $C_4$ gas stream, and wherein the first hydrocarbon product comprises $C_5+$ liquid hydrocarbons; wherein the first separating unit comprises a distillation column configured to receive at least a portion of the first hydrocarbon product and to produce a treated hydrocarbon stream and a first heavies stream, wherein the treated hydrocarbon stream comprises $C_5$ to $C_8$ hydrocarbons, wherein the treated hydrocarbon stream comprises one or more chloride compounds an amount of less than about 10 ppmw chloride, based on the total weight of the treated hydrocarbon stream, wherein the treated hydrocarbon stream comprises olefins in an amount of less than about 1 wt. %, based on the total weight of the treated hydrocarbon stream, wherein the treated hydrocarbon stream is characterized by a boiling end point of less than about 370° C., and wherein the first heavies stream comprises $C_9+$ hydrocarbons; wherein the hydrodealkylating unit comprises a hydrodealkylating catalyst, wherein the hydrodealkylating unit is configured to receive hydrogen and at least a portion of the first heavies stream and to operate at a temperature of from about 300° C. to about 500° C. and a pressure of from about 20 barg to about 40 barg to produce a second hydrocarbon product and a third $C_1$ to $C_4$ gas stream, wherein the second hydrocarbon product comprises $C_5+$ liquid hydrocarbons, wherein an amount of $C_6$ to $C_8$ aromatic hydrocarbons in the second hydrocarbon product is greater than an amount of $C_6$ to $C_8$ aromatic hydrocarbons in the first heavies stream; wherein the steam cracker is configured to receive at least a portion of the treated hydrocarbon stream (or a treated hydrocarbon stream after removal of $C_6$ to $C_8$ aromatic hydrocarbons) and to produce a steam cracker product stream, wherein the steam cracker requires (i) an amount of chloride in a feed stream to the steam cracker to be less than 10 ppmw chloride, based on the total weight of the feed stream, (ii) an amount of olefins in a feed stream to the steam cracker to be less than 1 wt. % olefins, based on the total weight of the feed stream, and (iii) a boiling end point of a feed stream to the steam cracker to be less than about 370° C., and wherein an amount of olefins in the steam cracker product stream is greater than an amount of olefins in the treated hydrocarbon stream; and wherein the second separating unit comprises a plurality of distillation columns configured to receive at least a portion of the steam cracker product stream and to produce an olefin gas stream, a saturated hydrocarbons gas stream, an aromatics stream, and a second heavies stream; wherein the olefin gas stream comprises ethylene, propylene, butylenes, butadiene, or combinations thereof; wherein the saturated hydrocarbons gas stream comprises methane, ethane, propane, butanes, hydrogen, or combinations thereof; wherein the aromatics stream comprises $C_6$ to $C_8$ aromatic hydrocarbons; wherein an amount of $C_6$ to $C_8$ aromatic hydrocarbons in the aromatics stream is greater than an amount of $C_6$ to $C_8$ aromatic hydrocarbons in the second hydrocarbon product; wherein the second heavies stream comprises $C_{5+}$ hydrocarbons other than $C_6$ to $C_8$ aromatic hydrocarbons; and wherein a $C_9+$ hydrocarbons content of a combination of the olefin gas stream, saturated hydrocarbons gas stream, and aromatics stream is less than about 5 wt. %, based on the weight of the combination of the olefin gas stream, saturated hydrocarbons gas stream, and aromatics stream.

Processes for processing plastic waste as disclosed herein can advantageously display improvements in one or more process characteristics when compared to otherwise similar processes that do not employ recycling of heavy streams (e.g., $C_9+$ hydrocarbons). The processes and systems for processing plastic waste as disclosed herein advantageously integrate pyrolysis, hydrocracking, hydrodealkylation, and steam cracking to maximize production of mono-ring aromatics in the $C_6$-$C_8$ range and light gas olefins.

Processes for processing plastic waste as disclosed herein can advantageously recycle $C_9+$ components to extinction to produce the more valuable light gas olefins and $C_6$-$C_8$ aromatics.

A splitter (e.g., a separating unit, such as a distillation column) can be advantageously used upstream of a steam cracker to feed naphtha material ($C_5$-$C_8$) to the steam cracker, while heavier streams from such splitter can be subjected to hydrodealkylation and converted to mono-ring aromatics in the $C_6$-$C_8$ range and steam cracker feed. The combined feed consisting of outlet streams from a hydroprocessing unit (e.g., hydrocracker) and a hydrodealkylation unit can feed the splitter upstream of the steam cracker. The heavy ends from steam cracker can be fed back preferably to the hydrocracker or optionally to the hydrodealkylation unit. All gases from units upstream of the steam cracker (hydrocracker, hydrodealkylation, pyrolysis) can feed the separation section downstream of the steam cracker, after scrubbing out acid gases. Additional advantages of the processes for processing plastic waste as disclosed herein can be apparent to one of skill in the art viewing this disclosure.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Examples 1 to 4 were conducted in a fixed bed reactor located inside a 3-zone split-tube furnace. The reactor internal diameter was 13.8 mm and had a concentrically located bed thermowell of 3 mm outer diameter. The reactor was 48.6 cm long. Commercial hydroprocessing catalyst of Co—Mo on alumina (8 g bone dry weight) was broken along the length to particles of 1.5 mm long and diluted with SiC in the ratio of 60% SiC to 40% catalyst to give a mean particle diameter of 0.34 mm. This was done to avoid slip through of the chlorides due to wall slip or channeling in the small diameter reactor. Pre-heating bed and post-catalyst inert beds was provided in the form of 1 mm glass beads. The catalyst bed temperature was controlled to isothermal by varying the controlled furnace zone skin temperatures. The catalyst was sulphided using 3 wt. % S in hexadecane (S was introduced as dimethyl disulphide). Liquid feed (i.e., the hydrocarbon liquid stream) to the hydrocracker was fed through a metering pump and $H_2$ gas was fed using a mass flow controller. The hydrocracker effluent gases were cooled to condense out the liquids (i.e., the first hydrocarbon product stream in the form of a liquid product) under pressure while allowing non-condensed gases (e.g., containing chloride(s), chlorine, hydrogen sulphide, or combinations thereof) to separate. Following liquid condensation, the pressure of the liquids was reduced and effluent gas flow was measured using a drum-type wet gas meter. The effluent gas flow was analyzed using a refinery gas analyzer (a custom gas analyzer from M/s AC Analyticals BV). The liquid product olefin content was determined using a Detailed Hydrocarbon Analyzer GC (DHA) (ASTM D6730) and a boiling point characterization was obtained using a SIMDIS GC (ASTM D6852). The liquid product chloride content was measured using a Chlora M-series analyzer (monochromatic wavelength dispersive X-ray Fluorescence technique, ASTM D7536).

Example 1

Examples 1-4 present aspects related to hydroprocessing unit 30 of FIG. 1.

In Example 1, a hydrocarbon feed mixture was prepared by mixing 30 wt. % n-hexadecane, 10 wt. % i-octane, 20 wt. % 1-decene, 20 wt. % cyclohexane, and 20 wt. % ethyl benzene. Dimethyl disulphide, 2-chloropentane, 3-chloro-3-methyl pentane, 1-chlorohexane, (2-chloroethyl) benzene, and chlorobenzene were then added to give 205 ppmw organic chlorides and a sulphur content of 2 wt. % S in the combined feed mixture. This combined feed mixture was used as the hydrocarbon stream which was contacted with the hydroprocessing catalyst in the packed bed reactor as mentioned above in the presence of $H_2$ at conditions of 280° C. reactor temperature, 60 barg reactor pressure, 0.92 $hr^{-1}$ WHSV, and 414 NL/L $H_2$/HC flow ratio. The liquid product (i.e., the treated hydrocarbon stream) was analyzed in a DHA wherein molecules lighter than $C_{13}$ are injected into the GC column and heavier than $C_{13}$ are flushed out. The normalized composition of liquid product as measured by DHA was paraffins (26.24 wt. %), i-paraffins (17.28 wt. %), olefins (0 wt. %), naphthenes (33.61 wt. %), and aromatics (22.88 wt. %). SIMDIS analysis of liquid product indicates that 78 wt. % of the liquid product boils at 180° C., and immediately at 79 wt. %, the boiling point shifts to 286° C.; indicating that 22 wt. % (i.e. 100−78=22) of the liquid product is hexadecane. This implies out of 30 wt. % hexadecane in the feed (calculated based on the feed excluding chloride and sulphides, since dimethyl disulphide is converted to gases, the chloride compounds are dechlorinated so as to contribute less than 0.5 wt. % of the product), 8 wt. % of hexadecane was hydrocracked to lower products. As mentioned before, this 22 wt. % heavier compounds (e.g., hexadecane) does not get analyzed in DHA. This 22 wt. % hexadecane unaccounted in DHA composition is added to the liquid product analyzed by DHA (DHA composition multiplied by 0.78 fraction that was injected into DHA) and the resulting composition of the liquid product is 42.47 wt. % paraffins, 13.48 wt. % i-paraffins, 0 wt. % olefins, 26.21 wt. % naphthenes and 17.84 wt. % aromatics. In addition, the chloride content of the liquid product was 0.09 ppmw.

Example 1 demonstrates it is possible to simultaneously dechlorinate, hydrogenate, and hydrocrack a PIONA hydrocarbon stream containing heavy hydrocarbon molecules (e.g., hexadecane), a chloride content of more than 200 ppm, and an olefin content of 20 wt. % (calculated based on the feed excluding chloride and sulphides) such that a portion of the heavy hydrocarbon molecules are hydrocracked, chloride content is reduced to less than 1 ppm, and olefins are completely removed (0 wt. % in the liquid product). Comparing feed and liquid product compositions, it can be said that an amount of paraffins, i-paraffins, and naphthenes has increased, while an amount of aromatics has been reduced, and olefins were completely depleted. This clearly indicates hydrocracking of hexadecane as well as hydrocracking of olefins in feed. Thus, Example 1 additionally demonstrates olefins are hydrocracked in addition to being hydrogenated.

The DHA analysis summary by carbon number for the liquid product is shown is shown in data table displayed in FIG. 2.

Example 2

Example 2 explores the effect of operating pressure on hydrocracking performance. A hydrocarbon feed mixture was prepared by mixing 30 wt. % n-hexadecane, 10 wt. % i-octane, 20 wt. % 1-decene, 20 wt. % cyclohexane, and 20 wt. % ethyl benzene. Dimethyl disulphide, 2-chloropentane, 3-chloro-3-methyl pentane, 1-chlorohexane, (2-chloroethyl) benzene, and chlorobenzene were then added to give 205 ppmw organic chlorides and a sulphur content of 2 wt. % S in the combined feed mixture. This combined feed mixture was used as a hydrocarbon stream which was contacted the sulphided hydroprocessing catalyst in the packed bed reactor as mentioned above in the presence of $H_2$ at conditions of 300° C. reactor temperature, 0.92 $hr^{-1}$ WHSV, and 414 NL/L $H_2$/HC flow ratio. Three different pressure conditions were studied: 60 barg for Example 2A, 20 barg for Example 2B, and 10 barg for Example 2C. The liquid products (i.e., the treated hydrocarbon streams) for each of Examples 2A to 2C were analyzed using SIMDIS, and the results are shown in data table displayed in FIG. 3A.

The DHA analysis summary of the liquid product boiling below 240° C. is shown in data table displayed in FIG. 3B.

The results provided in the tables above indicate that 20 wt. % or less of the liquid product for each of Examples 2A to 2C boils in the hexadecane boiling point range. In contrast, the feed contained 30 wt. % hexadecane (calculated based on the feed excluding chlorides and sulphides). Hence, at all pressures, hydrocracking of heavy hydrocarbon molecules (e.g., hexadecane) using a hydrogenation catalyst is demonstrated.

The corresponding chloride contents of the liquid product (i.e., first hydrocarbon product stream) at 60 barg, 20 barg, and 10 barg were respectively 0.11 ppmw, 0.09 ppmw, and 0.12 ppmw.

The liquid product (analyzed in DHA) for Example 2A (60 barg) contained 0.183 wt. % olefins, for Example 2B (20 barg) contained 0.047 wt. %, and for Example 2C (10 barg) contained 0 wt. % olefins. At lower pressures, a significant increase in aromatics is observed.

Example 2 demonstrates it is possible to simultaneously dechlorinate and hydrocrack a PIONA hydrocarbon stream containing heavy hydrocarbon molecules (e.g., hexadecane) and a chloride content of more than 200 ppmw such that a portion of the heavy hydrocarbon molecules are hydrocracked and chloride content is reduced to less than 1 ppm for all pressures tested.

Example 3

In Example 3, a hydrocarbon feed mixture was prepared to contain 30 wt. % n-hexadecane, 10 wt. % i-octane, 20 wt. % 1-decene, 20 wt. % cyclohexane and 20 wt. % ethyl benzene. To this mixture, the organic chlorides mentioned in Example 2 above were added along with dimethyl disulphide to give 205 ppmw organic chlorides and 2 wt. % S in the mixture. This feed was used as a hydrocarbon stream which was contacted with the sulphided hydroprocessing catalyst in the packed bed reactor as mentioned above in the presence of $H_2$ at conditions of 260° C. reactor temperature, 60 barg reactor pressure, 0.92 $hr^{-1}$ WHSV and 414 NL/L $H_2$/HC flow ratio. The liquid product (i.e., the first hydrocarbon product stream) contained 0.1 ppmw chloride.

Example 3 demonstrates the effective removal of chloride compounds from a hydrocarbon stream at very low temperatures.

Example 4

In Example 4, a feed was prepared by mixing plastic pyrolysis oil (36.3 g) with n-hexadecane (240 g), and then adding dimethyl disulphide (the sulphide) and 1-chlorohexane (the chloride compound) to give a sulphur content of 2.34 wt. % and 836 ppm chloride in the feed. This feed was used as a hydrocarbon stream which was contacted with the hydroprocessing catalyst in the packed bed reactor as mentioned above in the presence of $H_2$ under several operating conditions as shown in data table displayed in FIG. 4A.

The gas composition of the reactor effluents is as below and indicates LPG gases are formed at temperatures close to 400 deg C., as shown in data table displayed in FIG. 4B.

Example 4 demonstrates it is possible to dechlorinate a hydrocarbon stream containing plastic pyrolysis oil and having chloride compounds from a chloride content of more than 800 ppm chlorides to less than 5 ppm in the liquid product. As can be seen from the above table, the chloride content of the liquid product (i.e., the first hydrocarbon product stream) increases when the reactor bed temperature is increased to at or above 350° C. At temperatures below 350° C., Example 4 demonstrates removal of chloride compounds to chloride contents less than 3 ppm, and even sub-ppm levels.

Example 5

Examples 5-9 present aspects related to pyrolysis unit 10 and/or pyrolysis separating unit 12 of FIG. 1.

Example 5 shows a high severity operation for the pyrolysis unit 10. An amount of 1.5 g of plastics feed and 9 g of catalyst mixture having a composition comprised of 37.5 wt. % ZSM-5 catalyst, with the remainder being spent fluid catalytic cracker (FCC) catalyst, were used in pyrolysis conversions in a fluidized bed reactor. Details regarding the experimental facility for Example 5 are described in U.S. Patent Publication No. 2014/0228606A1, which is incorporated herein by reference in its entirety. The mixed plastics feed had the composition shown in data table displayed in FIG. 5A.

The reaction temperature at start of reaction was 670° C. The one-minute average bed temperatures achieved was 569.6° C. The Catalyst/Feed (C/F) ratio was 6. Fluidization $N_2$ gas flow rate used was 175N cc/min. Overall yields of aromatic and liquid i-paraffin products boiling below 240° C. were 31.6 wt. % and 5.76 wt. %, respectively. Their respective concentrations in the liquid product boiling below 240° C. were 74.72 wt. % and 13.22 wt. %. The yield of light gas olefins, i.e., the sum of yields of ethylene, propylene and butylenes was 32.69 wt. %, and the total yield of gas products was 45.17 wt. %.

The DHA analysis of the liquid product boiling below 240° C. shown in data table displayed in FIG. 5B.

The yield of heavy products boiling above 370° C. was 0.86 wt. %.

Example 6

Example 6 shows a high severity operation for the pyrolysis unit 10, operated in a hydrogen-assisted hydropyrolysis mode. An amount of 1.5 g of mixed plastics was mixed with 9 g of a catalyst mixture comprising 62.5 wt. % spent FCC catalyst and 37.5 wt. % ZSM-5 zeolite catalyst. The combined mixture was then fed to the fluidized bed reactor described in Example 5. The plastic feed was in the form of a 200 micron plastic powder. A mixture of 10% $H_2$ in $N_2$ was employed as the carrier gas at a flow rate of 175 $N_2$ cc/min.

Studies were conducted by maintaining the reactor bed temperature, before feed and catalyst mixture was introduced, at 600° C., 635° C., and 670° C., respectively, i.e., at 3 different starting temperatures. Studies were also conducted at the same conditions as before with 100% $N_2$ as carrier gas (pyrolysis mode). For each of the temperature conditions studied, a new set of catalyst and feed mixture was prepared and used.

The data tables in FIGS. 6A-6F summarize the experimental findings, where all studies used a mixed plastic feed and spent FCC (62.50 wt. %)+ZSM-5 zeolite catalyst (37.5 wt. %) as the pyrolysis catalyst.

Overall, yield of gas products has increased and liquid products have decreased indicating higher conversions to lighter products, as shown in data table displayed in FIG. 6B.

As it can be seen, the yield of light gas olefins per unit amount of coke deposited on the catalyst is higher in the case of hydropyrolysis. This implies that more light gas olefins would be produced in a circulating fluid catalytic cracking type of unit. In these units, performance is compared on a constant coke yield basis. This is because the amount of coke burnt off in the regenerator is limited by the air availability in the regenerator and as a result the regenerated catalyst returned back to the riser would have more coke (pyrolysis mode) or less coke (hydropyrolysis mode) on it which would in turn affect its activity in the riser.

The total aromatics as well as $C_6$-$C_8$ aromatics yield per unit amount of coke deposited is also higher in the case of hydropyrolysis, as shown in data table displayed in FIG. 6C. This implies in hydropyrolysis more aromatic products would be produced in a circulating fluid catalytic cracking type of unit.

To summarize, more high value chemicals (i.e., light gas olefins and aromatics) are produced in hydropyrolysis as compared to pyrolysis done without use of hydrogen carrier gas, as shown in data table displayed in FIG. 6D.

Additional benefits, as shown in the data table displayed in FIG. 6E, include (a) increased olefinicity of product gases; (b) increased ratio of propylene/propane as compared to ethylene to ethane and butylenes/butanes; (c) lower hydrogen transfer index (i.e. ratio of $C_3$ and $C_4$ saturates/$C_3$ olefins) in hydropyrolysis as compared to use of nitrogen only as carrier gas; and (d) more $C_4$ iso-olefins are produced in as compared to 1-butene in hydropyrolysis (i.e. isomerization index is lower).

Detailed hydrocarbon analysis (DHA) of liquid products below 240° C. is shown in the data table displayed in FIG. 6F.

Example 7

Example 7 shows a low severity pyrolysis operation. The experimental set up consisted of a stainless steel reactor pot followed by a fixed bed (tubular) reactor packed with ZSM-5 zeolite extrudates and the outlet of this tubular reactor was connected to a stainless steel condenser/receiver tank. The reactor pot was heated using heating tapes with temperature controller. An amount of 100 g of mixed plastic as per composition provided in Example 5 was charged along with ZSM-5 zeolite catalyst powder of 75 microns average particle size into the reactor and the heating was started. The reactor temperature was maintained constant at 450° C. for a period of 1 hr. The effluent from this reactor pot was continuously passed through the hot tubular reactor packed with ZSM-5 extrudates and maintained at 450° C. The product from the tubular reactor was sent to the receiver. The outgoing gas from the receiver was passed through NaOH scrubber and then diluted with $N_2$ and vented out through a carbon bed. Two different catalyst loadings were tested as follows: (i) Experiment 1: Equivalent to 5 wt. % of the feed was the catalyst charged in the tubular reactor and 5 wt. % equivalent catalyst was charged in the reactor pot (i.e. 10 wt. % of catalyst overall); (ii) Experiment 2: Equivalent to 5 wt. % of the feed was the catalyst charged in the tubular reactor and 15 wt. % equivalent catalyst was charged in the reactor pot (i.e. 20 wt. % catalyst overall).

Figure 7:
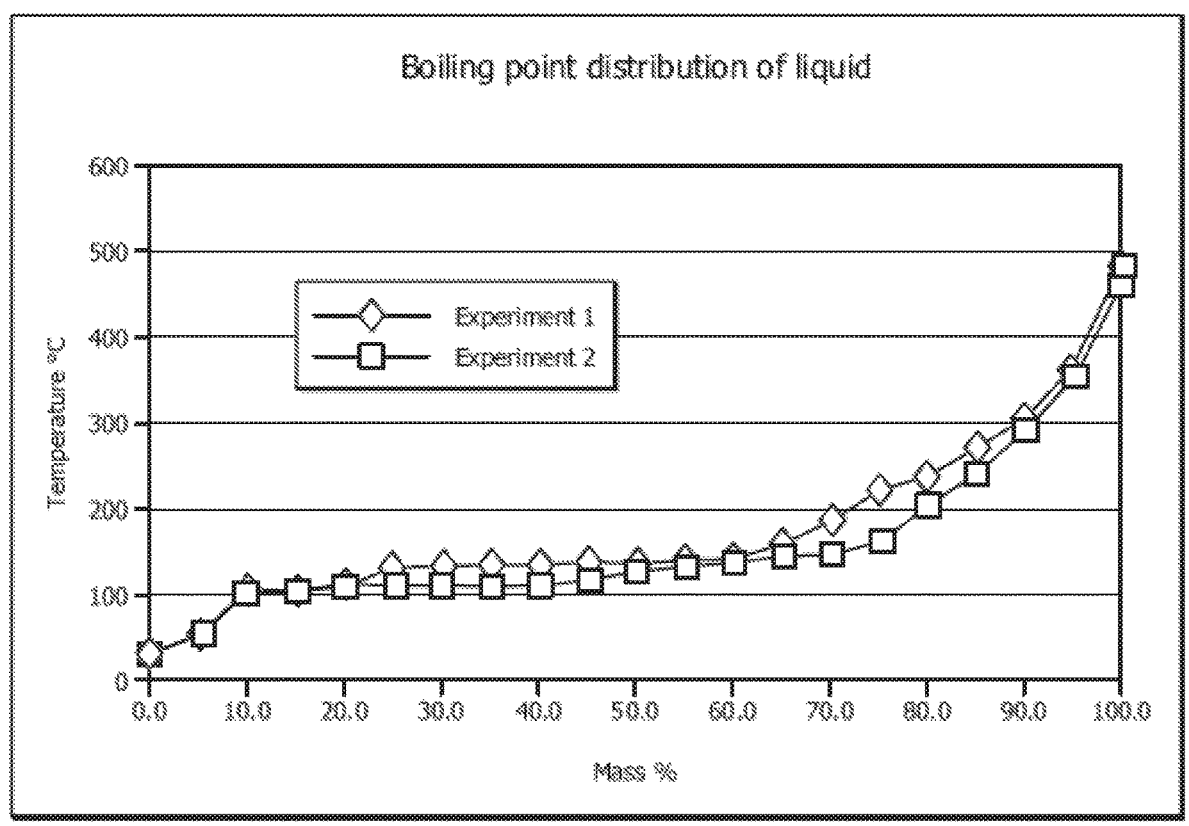
FIG. 7 displays a graph of the boiling point distribution for a liquid product of a low severity pyrolysis process, showing temperature versus mass percent.

FIG. 7 shows the boiling point distribution of the liquid product obtained indicated that 95 wt. % of the liquid product boiled below 370° C.

The DHA analysis of the liquid product boiling below 240° C. indicated significant presence of olefins and aromatics, as shown in the data table displayed in FIG. 8.

Example 8

Example 8 demonstrates a low severity pyrolysis with PVC present in the feed. An amount of 100 g of mixed plastic feed as per the composition provided in Example 5 above was mixed with 2 wt. % of ZSM-5 zeolite catalyst powder and heated in a round bottom flask fitted with a condenser. The round bottom flask was maintained at 360° C. for 1 hour. The liquid product had 60 ppmw chlorides. A similar experiment conducted with head space purging of the round bottom flask with $N_2$ gas provided a liquid product with no detectable chloride content. Chloride content in the liquid products was determined by fusing liquid products in NaOH followed by extraction in water and measurement of the resultant aqueous solution chloride content using ion chromatography. This example also demonstrates the possibility of head space purging in a pyrolysis unit to enhance dechlorination.

Example 9

Example 9 demonstrates a low severity pyrolysis process in a fluidized bed. An amount of 1.5 g of mixed plastic feed as per composition provided in Example 5 was mixed with 9.05 g of a catalyst mixture containing 62.5 wt. % of FCC spent catalyst and 37.5 wt. % of ZSM-5 Zeolite catalyst. This combined mixture was charged into the fluidized bed reactor described in Example 5. Before charging of feed and catalyst mixture the reactor was at a temperature of 450° C. The reactor temperature decreased as the feed was charged and later increased to the set point of 450° C. Data provided below also capture the temperature profile in the reactor bed as a function of time. The 1 min, 6 min, and 10 min average bed temperatures were 333° C., 369° C., and 395° C., respectively. The 1 min average represents the average reaction temperature severity when most temperature changes occur in the reactor. The 6 min average represents the temperature severity when the reactor temperature has recovered and reached the previously set value. Most of the conversion in the low severity case was expected to have been completed at the 6 min average. The data below shows that the liquid product is highly aromatic, the heavier than 370° C. boiling material is only about 2 wt. %, and more than 90 wt. % of the liquid product boils below 350° C.

The product yield data is shown in the data table displayed in FIG. 9A.

The boiling point distribution is shown in the data table displayed in FIG. 9B.

The detailed analysis of the liquid product is shown in the data table displayed in FIG. 9C.

Example 10

Examples 10-15 present aspects related to hydrodealkylating unit 60 of FIG. 1.

All hydroprocessing experiments were conducted with a Co—Mo oxides on alumina hydrotreating catalyst, and by using the following procedure, unless otherwise specified. The hydrotreating catalyst was activated by sulphiding it with a hexadecane feed spiked with 3 wt. % sulphur from dimethyl disulphide (DMDS). Following complete sulphiding of the catalyst, a chloride (205 ppm) and sulphide (2 wt. %) containing PIONA (n-paraffin, i-paraffin, olefin, naphthene, aromatics) feed (30% hexadecane, 10% i-octane, 20% 1-decene, 20% cyclohexane and 20% ethyl benzene) was introduced into the reactor bed at an operating temperature of 260° C.; an operating pressure of 60 barg, a weight hourly space velocity (WHSV) of 0.92 $hr^{-1}$; and 414 NL/L hydrogen to hydrocarbon ratio. The continuous processing of the feed led to not only dechlorination of feed, but also the acidification of the hydrotreating catalyst, thereby resulting in a catalyst containing hydrogenation (sulphided metal sites) and cracking sites (alumina chloride). Following this optional pretreatment, the catalyst was then contacted with a plastic pyrolysis oil doped with organic chlorides and sulphides. Under different operating conditions covered in the examples below, simultaneous dehydrochlorination, hydrocracking and hydrodealkylation was achieved. Thus it was possible to generate steam cracker feed meeting the required specifications.

Mixed plastic having a composition of 82% polyolefins, 11% polystyrene and 7% polyethylene terephthalate (PET) was converted to a pyrolysis oil in a circulating fluidized bed riser reactor employing a spent fluid catalytic cracking catalyst containing USY Zeolite. The cup mix zone temperature of the feed and the catalyst at the bottom of the riser reactor was 535° C. (downstream of the feed and catalyst introduction position). The gas yield was 58.8 wt. %, liquid yield was 32.9 wt. %, and coke yield was 8.4 wt. %. The yield of gasoline (<220° C.) was 29.3 wt. % and the balance liquid was in diesel and heavy ends. 36 g of this liquid product was mixed with 240 g of n-hexadecane to prepare a feed mixture (e.g., hydrocarbon stream). This resultant mixture was used in subsequent experiments in fixed bed reactors as a feed, as detailed in examples below. The composition of the feed mixture was investigated by performing a detailed hydrocarbon analysis (DHA) (ASTM D6730) for the liquid boiling below 240° C. and a boiling point distribution by SIMDIS GC (ASTM D6852). A detailed hydrocarbon analysis (DHA) of liquid boiling below 240° C. of the feed mixture is displayed in data Table 1 in FIG. 10A, and the boiling point distribution of this feed is displayed in data Table 2 in FIG. 10B.

The results in Table 2 (FIG. 10B) indicate that about 9.73 wt. % of the feed boils below 240° C. and 14.4 wt. % of the feed boils below 280° C. On a heavies and unknown-free basis, the wt. % of various species in feed boiling below 240° C. is as displayed in Table 3 in FIG. 10C. The feed contains 87.7% aromatics.

Organic chlorides and DMDS were mixed with this feed to give a chloride content of 836 ppmw chloride, based on the total weight of the feed and a sulphur content of the feed of 2.34 wt. % sulphur, based on the total weight of the feed. The data in Table 3 (FIG. 10C) will be used in Examples 12, 13, 14 and 15 to determine the formation or consumption of different hydrocarbon species and the data in Table 2 (FIG. 10B) will be used to determine how much of additional liquid product boiling below 240° C. or 280° C. was formed.

Example 11

A hydroprocessing experiment was conducted as described in Example 10, wherein n-hexadecane doped with 1,034 ppmw organic chlorides and 2 wt. % S was used in the trials with the fixed bed catalyst system. The experiment was conducted at a reactor catalyst bed temperature of 300° C. and a pressure of 40 barg, at a WHSV of 0.92 hr$^{-1}$, and at a hydrogen to hydrocarbon ratio of 414 NL/L. Simulated distillation results for the liquid product are displayed in data Table 4 in FIG. 11A.

The results in Table 4 (FIG. 11A) indicate that 13.5 wt. % of the product boils below 240° C. and 18 wt. % of the product boils below 280° C. The overall boiling points correspond to the use and conversion of the n-hexadecane feed. The liquid product had 0.3 ppmw chloride content. The DHA results for the liquid product boiling below 240° C. are displayed in data Table 5 in FIG. 11B.

The data in Table 5 (FIG. 11B) were normalized on a heavies and unknown-free basis, and the wt. % concentration of various species in the liquid product boiling below 240° C. is displayed in data Table 6 in FIG. 11C.

By accounting for 13.5 wt. % of n-hexadecane being converted to species boiling below 240° C., the yields of these species in wt. % of n-hexadecane feed were calculated and are displayed in data Table 7 in FIG. 11D.

The data in Table 7 (FIG. 11D) indicate that n-hexadecane was predominantly converted to n-paraffins, i-paraffins, naphthenes and aromatics. Using these data, it is possible to determine the contribution of n-hexadecane in a feed mixture with pyrolysis oils to formation of PIONA products.

Example 12

Additional studies were also carried out as described in Example 10, wherein the experimental conditions are displayed in data Table 8 in FIG. 12A, and wherein data were calculated as described in Example 11.

The DHA results for the liquid product boiling below 240° C. are displayed in data Table 9 in FIG. 12B for Example 12.

On a heavies and unknown-free basis, the DHA analysis results are displayed in data Table 10 in FIG. 12C. As compared to the aromatics content of the feed of 87.7%, there was a significant drop in product aromatics to 13.19% on a heavies and unknown-free basis, indicating ring opening hydrocracking was more favored at high pressures.

The boiling point distribution of the liquid product is displayed in data Table 11 in FIG. 12D.

The results in Table 11 (FIG. 12D) indicate that 13.3 wt. % of the product boils below 240° C. and 15 wt. % of the product boils below 280° C. By accounting for 13.3 wt. % of liquid product boiling below 240° C., the corresponding yields of the species in wt. % of feed were calculated and are displayed in data Table 12 in FIG. 12E.

Further, by subtracting the yields in Table 12 (FIG. 12E) from the feed wt. % composition outlined in Example 10, yields for newly or freshly formed species were obtained and are displayed in data Table 13 in FIG. 12F.

The data in Table 13 (FIG. 12F) clearly indicate that the alkyl aromatics in feed convert to other paraffin, naphthene and olefin compounds. At the relatively high pressure of 60 barg employed in this experiment, excepting $C_6$ aromatics, all other aromatics are also getting converted. Hence, if it is preferred to ring open all aromatics, high pressure conditions would help.

Example 13

Additional studies were also carried out as described in Examples 10 and 12, wherein the experimental conditions were as outlined in Table 8 (FIG. 12A), and wherein data were calculated as described in Examples 11 and 12. The DHA results for the liquid product boiling below 240° C. are displayed in data Table 14 in FIG. 13A.

On a heavies and unknown-free basis, the DHA analysis results are displayed in data Table 15 in FIG. 13B. The $C_9$+ aromatics content of 66.3% in feed dropped down to 23.27% in the product, indicating significant dealkylation of $C_9$+ aromatics. The $C_6$-C8 aromatics in products were 21.73%, a slight change from 21.37% in feed.

The boiling point distribution of the liquid product is displayed in data Table 16 in FIG. 13C.

The results in Table 16 (FIG. 13C) indicate that 13.1 wt. % of the product boils below 240° C. and 16.5 wt. % of the product boils below 280° C. By accounting for 13.1 wt. % of liquid product boiling below 240° C., the corresponding yields of the species in wt. % of feed were calculated and are displayed in data Table 17 in FIG. 13D.

Further, by subtracting the yields in Table 17 (FIG. 13D) from the feed wt. % composition outlined in Example 10, yields for newly or freshly formed species were obtained and are displayed in data Table 18 in FIG. 13E.

The data in Table 18 (FIG. 13E) clearly indicate that the alkyl aromatics in feed convert to other paraffin, naphthene and olefin compounds. Additionally, higher molecular weight compounds in the feed convert to lower molecular weight components. The data in Table 18 (FIG. 13E) clearly indicate a reduction in $C_9$ to $C_{12}$ aromatics. This reduction was 53%, as compared to $C_9$+ aromatics in feed. The reduction was computed by dividing the difference in $C_9$+ aromatics from Table 18 (FIG. 13E) by the $C_9$+ aromatics from Table 3 (FIG. 10C), and by further expressing the results as a % reduction. In addition, formation of $C_6$-$C_8$ aromatics was 36.4%, following a similar calculation.

Example 14

Additional studies were carried out as described in Examples 10 and 12, wherein the experimental conditions were as outlined in Table 8 (FIG. 12A), and data were calculated as described in Examples 11 and 12. The DHA results for the liquid product boiling below 240° C. are displayed in data Table 19 in FIG. 14A.

On a heavies and unknown-free basis, the DHA analysis results are displayed in data Table 20 in FIG. 14B.

The boiling point distribution of the liquid product is displayed in data Table 21 in FIG. 14C.

The results in Table 21 (FIG. 14C) indicate that 13.5 wt. % of the product boils below 240° C. and 28.2 wt. % of the product boils below 280° C. By accounting for 13.5 wt. % of liquid product boiling below 240° C., the corresponding yields in wt. % of feed were calculated and are displayed in data Table 22 in FIG. 14D.

Further, by subtracting the yields in Table 22 (FIG. 14D) from the feed wt. % composition outlined in Example 10, yields for newly or freshly formed species were obtained and are displayed in data Table 23 in FIG. 14E.

The data in Table 23 (FIG. 14E) clearly indicate that the alkyl aromatics in feed convert to other paraffin, naphthene and olefin compounds. Additionally, higher molecular weight compounds in the feed convert to lower molecular weight components. The data in Table 23 (FIG. 14E) clearly indicate a reduction in $C_9$ to $C_{12}$ aromatics (45.9% reduction of $C_9$+ aromatics using similar calculations as in Example 13) and a formation of $C_6$-$C_8$ aromatics (20.12% formation using similar calculations as in Example 13).

Example 15

Additional studies were also carried out as described in Examples 10 and 12, wherein the experimental conditions were as outlined in Table 8 (FIG. 12A), and wherein data were calculated as described in Examples 11 and 12. The boiling point distribution of the liquid product is displayed in data Table 24 in FIG. 15A.

The results in Table 24 (FIG. 15A) indicate that 21.8 wt. % of the product boils below 240° C. and 50.3 wt. % of the product boils below 280° C.

Overall, a summary of the results from Examples 13 to 16 is displayed in data Table 25 in FIG. 15B.

The data in Examples 12 to 15 indicate that at higher temperatures of operation, the conversions to below 240° C. boiling product, as well as below 280° C. boiling product increases. Further, at lower pressures and higher temperatures, $C_9$-$C_{12}$ aromatics yields are reduced while $C_6$-$C_8$ aromatics yields are preserved or improved. Further, at higher pressures, $C_6$-$C_8$ aromatics yields also are reduced. The resulting product can be saturated to a product olefin content to less than 1 wt. % by mild hydrogenation in a downstream hydrogenation unit by applying conventional hydrogenation catalysts, or in the same reactor (e.g., hydroprocessing reactor) by increasing contact time. Overall, the data indicate that higher alkyl aromatics can be dealkylated selectively while preserving $C_6$-$C_8$ aromatics and while having simultaneous dehydrochlorination and hydrocracking.

Example 16

Examples 16-19 present aspects related to steam cracker 50 of FIG. 1.

Example 16 demonstrates how a steam cracker is used in combination with pyrolysis and hydroprocessing unit. Gases ($C_1$-$C_4$) from a pyrolysis unit and hydroprocessing facility are fed to gas crackers. Liquids from the hydroprocessing facility are fed to liquid steam crackers.

Gas steam cracking of a feed consisting of 16.75 wt. % ethane, 34.62 wt. % propane, 27.62 wt. % isobutane and 21 wt. % butane, carried out at a steam cracker coil outlet temperature of 840° C., a steam/hydrocarbon ratio of 0.35, and a coil outlet pressure of 1.7 bar, resulted in a product having 0.48 wt. % acetylene, 34.1 wt. % ethylene, 12.21 wt. % propylene, and 2.41 wt. % butadiene, among other products.

Steam cracking a naphtha feed (boiling cut from initial boiling point to 220° C.) having 20.3 wt. % paraffin, 27.9 wt. % i-paraffins, 14.5 wt. % aromatics, and 36.9 wt. % naphthenes at a coil outlet temperature of 865° C., a coil outlet pressure of 1.7 bar, and a steam to oil ratio of 0.5 resulted in a product having 25.86 wt. % ethylene, 12.14 wt. % propylene, and 4.98 wt. % butadiene.

Steam cracking of gas oils (>220° C. boiling point to 380° C.) resulted in a product having 24 wt. % ethylene, 14.45 wt. % propylene, 4.7 wt. % butadiene, and 4.5 wt. % butylenes.

Example 17

A mixed plastic waste was cracked in modular units at low severity conditions or catalytically cracked in a circulating fluidized bed at high severity or catalytically cracked in a circulating fluidized bed at low severity to produce a pyrolysis oil. The results from these cracking experiments are shown below in the data tables in FIG. 16A. The cup mix temperature was varied between 400-600° C., specifically 450-550° C. Depending on the severity of the operation, the gases and the liquid products were separated. The composition of the cracked liquid product is shown below in the table. The saturate hydrocarbons present in the gas were sent to gas crackers which were an ethane cracker or propane cracker. The gas cracker was selected depending on the desired end product. The cracked liquid from the pyrolysis unit was sent to hydrotreating to saturate all the liquid olefins, as this is a requirement for the liquid/naphtha cracker. Hydrotreating was performed at 300-450° C. and pressure 20-100 barg using commercially available hydrotreating catalyst to produce a hydrotreated oil. The typical composition of this hydrotreated oil was 35-45% paraffins, 35-45% iso-paraffins, 15-20% naphthenes and 5-10% aromatics, with a liquid boiling below 400° C. The table below shows an example of the composition of the hydrotreated oil (e.g., first hydrocarbon product stream). The hydrotreated oil was then subjected to steam cracking wherein the light gas olefins were maximized and the gas saturates formed were routed to a gas cracker. In this example, 16.3 wt. % saturates produced by pyrolysis were sent to the gas cracker to form more light gas olefins, such as ethylene and propylene.

The hydrotreated oil, normally a pygas, is naphtha range material with high aromatic content. This liquid can be subjected to aromatic extraction after mild hydrogenation and non-aromatic stream can be sent back to the naphtha/steam cracker for further cracking.

The results for a saturated pyrolysis oil feed to the steam cracker having a composition of paraffins, olefins, naphthenes, and aromatics (P/O/N/A) are shown in the data tables in FIG. 16A.

Depending on the composition for the pyrolysis liquid, whether it is from low severity catalytic cracking from continuous circulating fluidized bed or from thermal cracking from any modular technology, the aromatic extraction unit can be positioned before the steam cracker or after the steam cracker. If the aromatic content of the pyrolysis liquid is greater 40%, having the aromatic extraction before steam cracker could minimize the coke formation and also maximize recovery of high value chemicals like benzene, toluene, xylene and ethyl benzene before sending it to steam cracker.

The products obtained from the steam cracker are displayed in the data table in FIG. 16B at steam-to-oil (S/O) ratio of 2 wt. %, a reaction residence time of 0.1 sec, and a temperature of 850° C. For purposes of the disclosure herein, the S/O ratio refers to the ratio expressed in mass percentage of the steam added to the steam cracker per total hydrocarbon feed of the steam cracker.

Example 18

This example is related to low and high severity pyrolysis of mixed waste plastic having 82% olefinic feed (e.g., high-density polyethylene (HDPE), low-density polyethylene (LDPE), linear low-density polyethylene (LLDPE), and polypropylene (PP)); 11% polystyrene (PS); and the remaining 7% polyethylene terephthalate (PET). This experiment was conducted in a continuous catalytic cracking circulating fluidized bed. In all cases, the light gas olefin make in the first step was >28% and gas saturates can be sent directly to gas crackers to further increase the light gas olefins. The gasoline and diesel range material can be hydrotreated to saturate the liquid olefins and can be further sent to naphtha cracker. The overall make of light gas olefins combining the 1st stage pyrolysis followed by gas cracker for saturates and naphtha cracker for liquids can account >60%.

The unconverted gas saturates from the steam cracker can be recycled back to the cracker for further cracking and formation of light gas olefins. The pygas obtained from the naphtha cracker would be rich in aromatics which would be sent to aromatic extraction for separations of benzene, toluene, xylene (BTX) and ethylbenzene (EB) (BTX+EB).

Overall, by combining a pyrolyzer with gas cracker and liquid cracker, the high value chemicals like light gas olefins would be >60% and BTX+EB>15-20%.

Liquid saturates in the gasoline and diesel range based on PIONA of pyrolysis oil would be sent to naphtha cracker for converting to high value chemicals. The $C_6$-$C_8$ range aromatics which are BTX+EB would be separated after hydrogenation. The higher aromatics which are normally di- and tri-aromatics would also be saturated or converted by ring opening and then total feed consisting of gasoline saturates, diesel and heavies range saturates would be fed to the steam cracker to boost the overall yield of light gas olefins and BTX+EB range aromatics.

Example 19

This example is related to high severity pyrolysis of mixed plastics having 82% olefinic feed (e.g., high-density polyethylene (HDPE), low-density polyethylene (LDPE), linear low-density polyethylene (LLDPE), and polypropylene (PP)); 11% polystyrene (PS); and the remaining 7% polyethylene terephthalate (PET) was conducted in a circulating fluidized bed pyrolysis unit by using a catalyst mixture containing 65% spent FCC catalyst+35% ZSM-5 zeolite catalyst with yields as shown in the data table in FIG. 18A. Hydrogen yield was 0.18%, ($CO+CO_2$) yield was 1.44%, and methane yield was 0.73%.

Gas saturates were fed to steam cracker. The composition of ethane, propane and butanes in the gas saturates stream was 5.85%, 26.15% and 68%, respectively. Cracking of 17.62% of plastic feed equivalent gas saturates in the cracker at 60% ethane conversion, 90% propane conversion, and 95% conversion of butane gave rise to a composition as shown in the data table in FIG. 18B.

The outlet had 9.68% light gas olefins and 0.63% BTX. Hydrogen was 0.22%, and methane was 3.79%.

Liquids were fed to a hydroprocessing unit as 31.3% equivalent of plastic feed. $C_6$-$C_8$ aromatics extraction from hydroprocessing unit liquid product was 13.47% equivalent of plastic feed. Balance liquid yield was 17.84%, of which 10.77% equivalent to plastic feed boiled in the gasoline range and 7.07% was in the Diesel and heavies boiling range. This liquid (17.84%) was routed through the dealkylation unit and a hydroprocessing unit to convert into saturated hydrocarbon molecules from $C_5$-$C_8$.

17.84% saturated liquid equivalent of plastic feed was fed to steam cracker. The output from steam cracker operated at high severity for this feed was as shown in the data table in FIG. 18C. The light gas olefins yield was 10.34%; BTX yield was 1.59%; hydrogen yield was 0.19%; and methane yield was 3.15%.

Overall, as can be seen from this example, the following yields were obtained: light gas olefins—61.67% (pyrolysis+ gas cracking+ liquid cracking); BTX+EB—15.69% at least; coke—5.6%; gasoline and fuel oil range liquids—1.85%; ($CO+CO_2$)—1.44%; hydrogen—0.59%; methane—7.67%; and saturated $C_2$-$C_4$ gases—5.49%.

Hence, through the flowsheet displayed in FIG. 1, it was possible to obtain 60+% light gas olefins and 15+% of BTX+EB.

Overall, through the above examples, the processes involved in the process configuration of the integrated flowsheet as depicted in FIG. 1 have been demonstrated to produce light gas olefins and mono-ring aromatics in the $C_6$-$C_8$ range.

The present disclosure is further illustrated by the following embodiments, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

Additional Disclosure

The following are enumerated embodiments which are provided as non-limiting examples.

A first aspect, which is a process for processing plastic waste comprising (a) converting a plastic waste to a hydrocarbon liquid stream and a first $C_1$ to $C_4$ gas stream in a pyrolysis unit; (b) contacting at least a portion of the hydrocarbon liquid stream with a first hydroprocessing catalyst in the presence of hydrogen in a hydroprocessing unit to yield a first hydrocarbon product and a second $C_1$ to $C_4$ gas stream, wherein the first hydrocarbon product comprises $C_5$+ liquid hydrocarbons; (c) introducing at least a portion of the first hydrocarbon product to a first separating unit to produce a treated hydrocarbon stream and a first heavies stream, wherein the treated hydrocarbon stream comprises $C_5$ to $C_8$ hydrocarbons, and wherein the first heavies stream comprises $C_9$+ hydrocarbons; (d) contacting at least a portion of the first heavies stream with a second hydroprocessing catalyst in the presence of hydrogen in a hydrodealkylating unit to yield a second hydrocarbon product and a third $C_1$ to $C_4$ gas stream, wherein the second hydrocarbon product comprises $C_5$+ liquid hydrocarbons, and wherein an amount of $C_6$ to $C_8$ aromatic hydrocarbons in the second hydrocarbon product is greater than an amount of $C_6$ to $C_8$ aromatic hydrocarbons in the first heavies stream; (e) conveying at least a portion of the second hydrocarbon product to the first separating unit; (f) feeding at least a portion of the treated hydrocarbon stream to a steam cracker to produce a steam cracker product stream, wherein an amount of olefins in the steam cracker product stream is greater than an amount of olefins in the treated hydrocarbon stream; (g) introducing at least a portion of the steam cracker product stream to a second separating unit to produce an olefin gas stream, a saturated hydrocarbons gas stream, an aromatics stream, and a second heavies stream; wherein the olefin gas stream comprises ethylene, propylene, butylenes, butadiene, or combinations thereof; wherein the saturated hydrocarbons gas stream contains methane, ethane, propane, butanes, hydrogen, or combinations thereof; wherein the aromatics stream comprises $C_6$ to $C_8$ aromatic hydrocarbons; and wherein the second heavies stream comprises $C_{5+}$ hydrocarbons other than $C_6$ to $C_8$ aromatic hydrocarbons; and (h) conveying at least a portion of the second heavies stream to the hydroprocessing unit.

A second aspect, which is the process of the first aspect further comprising conveying a portion of the first heavies stream to the hydroprocessing unit.

A third aspect, which is the process of any one of the first and the second aspects further comprising conveying a portion of the second hydrocarbon product to the hydroprocessing unit.

A fourth aspect, which is the process of any one of the first through the third aspects further comprising conveying a portion of the second heavies stream to the hydrodealkylating unit.

A fifth aspect, which is the process of any one of the first through the fourth aspects, wherein the first hydroprocessing catalyst and the second hydroprocessing catalyst are the same or different.

A sixth aspect, which is the process of any one of the first through the fifth aspects, wherein the first hydroprocessing catalyst and/or the second hydroprocessing catalyst comprise cobalt and molybdenum on an alumina support, nickel and molybdenum on an alumina support, tungsten and molybdenum on an alumina support, cobalt and molybdenum oxides on an alumina support, nickel and molybdenum oxides on an alumina support, tungsten and molybdenum oxides on an alumina support, cobalt and molybdenum sulphides on an alumina support, nickel and molybdenum sulphides on an alumina support, tungsten and molybdenum sulphides on an alumina support, a zeolite comprising one or more metals, or combinations thereof.

A seventh aspect, which is the process of the sixth aspect, wherein each metal of the one or more metals can be selected from the group consisting of cobalt, molybdenum, tungsten, nickel, titanium, copper, magnesium, tin, iron, zinc, tungsten, vanadium, gallium, calcium, manganese, ruthenium and rhenium; and wherein the zeolite comprises ZSM-5, ZSM-11, Y, high-silica Y, USY, or combinations thereof.

An eighth aspect, which is the process of any one of the first through the seventh aspects, wherein the second hydroprocessing catalyst comprises a hydrodealkylation catalyst, chromium oxides on an alumina support, chromium oxides on a silica support, molybdenum oxides on an alumina support, molybdenum oxides on a silica support, platinum on an alumina support, platinum on a silica support, platinum oxides on an alumina support, platinum oxides on a silica support, or combinations thereof.

A ninth aspect, which is the process of the sixth aspect, wherein the second hydroprocessing catalyst is chlorided and sulphided in-situ.

A tenth aspect, which is the process of any one of the first through the ninth aspects, wherein the step (b) of contacting the hydrocarbon liquid stream with a first hydroprocessing catalyst further comprises contacting one or more sulphides contained in and/or added to the hydrocarbon liquid stream with the first hydroprocessing catalyst.

An eleventh aspect, which is the process of the tenth aspect, wherein the one or more sulphides are contained in and/or added to the hydrocarbon liquid stream in an amount effective to provide for a sulphur content of the hydrocarbon liquid stream of from about 0.05 wt. % to about 5 wt. %, based on the total weight of the hydrocarbon liquid stream.

A twelfth aspect, which is the process of any one of the first through the eleventh aspects, wherein the step (d) of contacting the first heavies stream with a second hydroprocessing catalyst further comprises contacting one or more sulphides contained in and/or added to the first heavies stream with the second hydroprocessing catalyst.

A thirteenth aspect, which is the process of the twelfth aspect, wherein the one or more sulphides are contained in and/or added to the first heavies stream in an amount effective to provide for a sulphur content of the first heavies stream of from about 0.05 wt. % to about 5 wt. %, based on the total weight of the first heavies stream.

A fourteenth aspect, which is the process of any one of the first through the thirteenth aspects, wherein the step (b) of contacting the hydrocarbon liquid stream with a first hydroprocessing catalyst and/or the step (d) of contacting the first heavies stream with a second hydroprocessing catalyst are performed at a temperature of from about 100° C. to about 500° C.

A fifteenth aspect, which is the process of any one of the first through the fourteenth aspects, wherein the step (b) of contacting the hydrocarbon liquid stream with a first hydroprocessing catalyst and/or the step (d) of contacting the first heavies stream with a second hydroprocessing catalyst are performed at a weight hourly space velocity of from about $0.1\ hr^{-1}$ to about $10\ hr^{-1}$.

A sixteenth aspect, which is the process of any one of the first through the fifteenth aspects, wherein the step (b) of contacting the hydrocarbon liquid stream with a first hydroprocessing catalyst and/or the step (d) of contacting the first heavies stream with a second hydroprocessing catalyst are performed at a hydrogen to hydrocarbon ratio of from about 10 NL/L to about 3,000 NL/L.

A seventeenth aspect, which is the process of any one of the first through the sixteenth aspects, wherein the step (b) of contacting the hydrocarbon liquid stream with a first hydroprocessing catalyst is performed at a pressure of from about 1 barg to about 200 barg.

An eighteenth aspect, which is the process of any one of the first through the seventeenth aspects, wherein the step (d) of contacting the first heavies stream with a second hydroprocessing catalyst is performed at a pressure of from about 1 barg to about 100 barg.

A nineteenth aspect, which is the process of any one of the first through the eighteenth aspects, wherein the hydrocarbon liquid stream further comprises one or more chloride compounds in an amount of equal to or greater than about 5 ppmw chloride, based on the total weight of the hydrocarbon liquid stream, wherein the treated hydrocarbon stream comprises one or more chloride compounds in an amount of less than about 5 ppmw chloride, based on the total weight of the treated hydrocarbon stream, and wherein a decrease in one or more chloride compounds results from dehydrochlorination of the hydrocarbon liquid stream during the step (b) of contacting the hydrocarbon liquid stream with a first hydroprocessing catalyst.

A twentieth aspect, which is the process of any one of the first through the nineteenth aspects, wherein the hydrocarbon liquid stream further comprises one or more chloride compounds in an amount of equal to or greater than about 20 ppmw chloride, based on the total weight of the hydrocarbon liquid stream.

A twenty-first aspect, which is the process of any one of the first through the twentieth aspects, wherein the treated hydrocarbon stream further comprises one or more chloride compounds an amount of less than about 10 ppmw chloride, based on the total weight of the treated hydrocarbon stream.

A twenty-second aspect, which is the process of any one of the first through the twenty-first aspects, wherein the treated hydrocarbon stream is characterized by a boiling end point of less than about 370° C.

A twenty-third aspect, which is the process of any one of the first through the twenty-second aspects, wherein the treated hydrocarbon stream is characterized by an olefin content of less than about 1 wt. % olefins, based on the total weight of the treated hydrocarbon stream.

A twenty-fourth aspect, which is the process of any one of the first through the twenty-third aspects, wherein at least a portion of the first $C_1$ to $C_4$ gas stream, at least a portion of the second $C_1$ to $C_4$ gas stream, at least a portion of the third $C_1$ to $C_4$ gas stream, or combinations thereof are introduced to an acid gas scrubber to produce a treated $C_1$ to $C_4$ gas stream, wherein an amount of acid gases in the treated $C_1$ to $C_4$ gas stream is less than an amount of acid gases in the first $C_1$ to $C_4$ gas stream, the second $C_1$ to $C_4$ gas stream, the third $C_1$ to $C_4$ gas stream, or combinations thereof, respectively.

A twenty-fifth aspect, which is the process of the twenty-fourth aspect, wherein at least a portion of the treated $C_1$ to $C_4$ gas stream is conveyed to the second separating unit.

A twenty-sixth aspect, which is the process of any one of the first through the twenty-fifth aspects, wherein the $C_5+$ liquid hydrocarbons comprise heavy hydrocarbon molecules, wherein the hydrocarbon liquid stream comprises heavy hydrocarbon molecules, and wherein an amount of heavy hydrocarbon molecules in the first hydrocarbon product is less than an amount of heavy hydrocarbon molecules in the hydrocarbon liquid stream due to hydrocracking of at least a portion of heavy hydrocarbon molecules from the hydrocarbon liquid stream during the step (b) of contacting the hydrocarbon liquid stream with a first hydroprocessing catalyst.

A twenty-seventh aspect, which is the process of any one of the first through the twenty-sixth aspects, wherein the amount of $C_6$ to $C_8$ aromatic hydrocarbons in the second hydrocarbon product is increased by equal to or greater than about 1 wt. %, when compared to the amount of $C_6$ to $C_8$ aromatic hydrocarbons in the first heavies stream, wherein the $C_9+$ hydrocarbons comprise $C_9+$ aromatic hydrocarbons, and wherein an increase in the amount $C_6$ to $C_8$ aromatic hydrocarbons is due to hydrodealkylating of at least a portion of $C_9+$ aromatic hydrocarbons from the first heavies stream during the step (d) of contacting the first heavies stream with a second hydroprocessing catalyst.

A twenty-eighth aspect, which is the process of any one of the first through the twenty-seventh aspects, wherein an amount of $C_6$ to $C_8$ aromatic hydrocarbons in the aromatics stream is greater than an amount of $C_6$ to $C_8$ aromatic hydrocarbons in the second hydrocarbon product.

A twenty-ninth aspect, which is the process of any one of the first through the twenty-eighth aspects, wherein a $C_9+$ hydrocarbons content of a combination of the olefin gas stream, saturated hydrocarbons gas stream, and aromatics stream is less than about 5 wt. %, based on the weight of the combination of the olefin gas stream, saturated hydrocarbons gas stream, and aromatics stream.

A thirtieth aspect, which is the process of any one of the first through the twenty-ninth aspects, wherein the plastic waste comprises equal to or greater than about 400 ppmw polyvinylchloride and/or polyvinylidene chloride, based on the total weight of the plastic waste.

A thirty-first aspect, which is a system for processing plastic waste comprising a pyrolysis unit, a hydroprocessing unit, a first separating unit, a hydrodealkylating unit, a steam cracker, and a second separating unit; wherein the pyrolysis unit is configured to receive a plastic waste and to produce a hydrocarbon liquid stream and a first $C_1$ to $C_4$ gas stream; wherein the hydroprocessing unit comprises a first hydroprocessing catalyst, wherein the hydroprocessing unit is configured to receive hydrogen and at least a portion of the hydrocarbon liquid stream and to produce a first hydrocarbon product and a second $C_1$ to $C_4$ gas stream, and wherein the first hydrocarbon product comprises $C_5+$ liquid hydrocarbons; wherein the first separating unit comprises a distillation column configured to receive at least a portion of the first hydrocarbon product and to produce a treated hydrocarbon stream and a first heavies stream, wherein the treated hydrocarbon stream comprises $C_5$ to $C_8$ hydrocarbons, wherein the treated hydrocarbon stream meets steam cracker feed requirements for chloride content, olefin content, and boiling end point, and wherein the first heavies stream comprises $C_9+$ hydrocarbons; wherein the hydrodealkylating unit comprises a second hydroprocessing catalyst, wherein the hydrodealkylating unit is configured to receive hydrogen and at least a portion of the first heavies stream and to produce a second hydrocarbon product and a third $C_1$ to $C_4$ gas stream, wherein the second hydrocarbon product comprises $C_5+$ liquid hydrocarbons, wherein an amount of $C_6$ to $C_8$ aromatic hydrocarbons in the second hydrocarbon product is greater than an amount of $C_6$ to $C_8$ aromatic hydrocarbons in the first heavies stream, and wherein the first hydroprocessing catalyst and the second hydroprocessing catalyst are the same or different; wherein the steam cracker is configured to receive at least a portion of the treated hydrocarbon stream and to produce a steam cracker product stream, wherein an amount of olefins in the steam cracker product stream is greater than an amount of olefins in the treated hydrocarbon stream; and wherein the second separating unit comprises a plurality of distillation columns configured to receive at least a portion of the steam cracker product stream and to produce an olefin gas stream, a saturated hydrocarbons gas stream, an aromatics stream, and a second heavies stream; wherein the olefin gas stream comprises ethylene, propylene, butylenes, butadiene, or combinations thereof; wherein the saturated hydrocarbons gas stream comprises methane, ethane, propane, butanes, hydrogen, or combinations thereof; wherein the aromatics stream comprises $C_6$ to $C_8$ aromatic hydrocarbons; wherein an amount of $C_6$ to $C_8$ aromatic hydrocarbons in the aromatics stream is greater than an amount of $C_6$ to $C_8$ aromatic hydrocarbons in the second hydrocarbon product; wherein the second heavies stream comprises $C_{5+}$ hydrocarbons other than $C_6$ to $C_8$ aromatic hydrocarbons; and wherein a $C_9+$ hydrocarbons content of a combination of the olefin gas stream, saturated hydrocarbons gas stream, and aromatics stream is less than about 5 wt. %, based on the weight of the combination of the olefin gas stream, saturated hydrocarbons gas stream, and aromatics stream.

A thirty-second aspect, which is the system of the thirty-first aspect further comprising an acid gas scrubber configured to receive at least a portion of the first $C_1$ to $C_4$ gas stream, at least a portion of the second $C_1$ to $C_4$ gas stream, at least a portion of the third $C_1$ to $C_4$ gas stream, or combinations thereof and to produce a treated $C_1$ to $C_4$ gas stream, wherein an amount of acid gases in the treated $C_1$ to $C_4$ gas stream is less than an amount of acid gases in the first $C_1$ to $C_4$ gas stream, the second $C_1$ to $C_4$ gas stream, the third $C_1$ to $C_4$ gas stream, or combinations thereof, respectively.

A thirty-third aspect, which is the system of any one of the thirty-first and the thirty-second aspects, wherein the second hydroprocessing catalyst is a hydrodealkylation catalyst.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A process for processing plastic waste comprising:
   (a) converting a plastic waste to a hydrocarbon liquid stream and a first $C_1$ to $C_4$ gas stream in a pyrolysis unit;
   (b) contacting at least a portion of the hydrocarbon liquid stream with a first hydroprocessing catalyst in the presence of hydrogen in a hydroprocessing unit to yield a first hydrocarbon product and a second $C_1$ to $C_4$ gas stream, wherein the first hydrocarbon product comprises $C_5+$ liquid hydrocarbons;
   (c) introducing at least a portion of the first hydrocarbon product to a first separating unit to produce a treated hydrocarbon stream and a first heavies stream, wherein the treated hydrocarbon stream comprises $C_5$ to $C_8$ hydrocarbons, and wherein the first heavies stream comprises $C_9+$ hydrocarbons;
   (d) contacting at least a portion of the first heavies stream with a second hydroprocessing catalyst in the presence of hydrogen in a hydrodealkylating unit to yield a second hydrocarbon product and a third $C_1$ to $C_4$ gas stream, wherein the second hydrocarbon product comprises $C_5+$ liquid hydrocarbons, and wherein an amount of $C_6$ to $C_8$ aromatic hydrocarbons in the second hydrocarbon product is greater than an amount of $C_6$ to $C_8$ aromatic hydrocarbons in the first heavies stream;
   (e) conveying at least a portion of the second hydrocarbon product to the first separating unit;
   (f) feeding at least a portion of the treated hydrocarbon stream to a steam cracker to produce a steam cracker product stream, wherein an amount of olefins in the steam cracker product stream is greater than an amount of olefins in the treated hydrocarbon stream;
   (g) introducing at least a portion of the steam cracker product stream to a second separating unit to produce an olefin gas stream, a saturated hydrocarbons gas stream, an aromatics stream, and a second heavies stream; wherein the olefin gas stream comprises ethylene, propylene, butylenes, butadiene, or combinations thereof; wherein the saturated hydrocarbons gas stream contains methane, ethane, propane, butanes, hydrogen, or combinations thereof; wherein the aromatics stream comprises $C_6$ to $C_8$ aromatic hydrocarbons; and wherein the second heavies stream comprises $C_5+$ hydrocarbons other than $C_6$ to $C_8$ aromatic hydrocarbons; and
   (h) conveying at least a portion of the second heavies stream to the hydroprocessing unit.

2. The process of claim 1 further comprising conveying a portion of the first heavies stream and/or a portion of the second hydrocarbon product to the hydroprocessing unit.

3. The process of claim 1, further comprising conveying a portion of the second heavies stream to the hydrodealkylating unit.

4. The process of claim 1, wherein the first hydroprocessing catalyst and the second hydroprocessing catalyst are the same or different.

5. The process of claim 1, wherein the first hydroprocessing catalyst and/or the second hydroprocessing catalyst comprise cobalt and molybdenum on an alumina support, nickel and molybdenum on an alumina support, tungsten and molybdenum on an alumina support, cobalt and molybdenum oxides on an alumina support, nickel and molybdenum oxides on an alumina support, tungsten and molybdenum oxides on an alumina support, cobalt and molybdenum sulphides on an alumina support, nickel and molybdenum sulphides on an alumina support, tungsten and molybdenum sulphides on an alumina support, a zeolite comprising one or more metals, or combinations thereof.

6. The process of claim 5, wherein each metal of the one or more metals can be selected from the group consisting of cobalt, molybdenum, tungsten, nickel, titanium, copper, magnesium, tin, iron, zinc, tungsten, vanadium, gallium, calcium, manganese, ruthenium and rhenium; and wherein the zeolite comprises ZSM-5, ZSM-11, Y, high-silica Y, USY, or combinations thereof.

7. The process of claim 1, wherein the second hydroprocessing catalyst comprises a hydrodealkylation catalyst, chromium oxides on an alumina support, chromium oxides on a silica support, molybdenum oxides on an alumina support, molybdenum oxides on a silica support, platinum on an alumina support, platinum on a silica support, platinum oxides on an alumina support, platinum oxides on a silica support, or combinations thereof.

8. The process of claim 1, wherein the step (b) of contacting the hydrocarbon liquid stream with a first hydroprocessing catalyst and/or the step (d) of contacting the first heavies stream with a second hydroprocessing catalyst are performed at a temperature of from about 100° C. to about 500° C.

9. The process of claim 1, wherein the step (b) of contacting the hydrocarbon liquid stream with a first hydroprocessing catalyst is performed at a pressure of from about 1 barg to about 200 barg.

10. The process of claim 1, wherein the hydrocarbon liquid stream further comprises one or more chloride compounds in an amount of equal to or greater than about 5 ppmw chloride, based on the total weight of the hydrocarbon liquid stream, wherein the treated hydrocarbon stream comprises one or more chloride compounds in an amount of less than about 5 ppmw chloride, based on the total weight of the treated hydrocarbon stream, and wherein a decrease in one or more chloride compounds results from dehydrochlorination of the hydrocarbon liquid stream during the step (b) of contacting the hydrocarbon liquid stream with a first hydroprocessing catalyst.

11. The process of claim 1, wherein the treated hydrocarbon stream is characterized by a boiling end point of less than about 370° C., and wherein the treated hydrocarbon stream is characterized by an olefin content of less than about 1 wt. % olefins, based on the total weight of the treated hydrocarbon stream.

12. The process of claim 1, wherein at least a portion of the first $C_1$ to $C_4$ gas stream, at least a portion of the second $C_1$ to $C_4$ gas stream, at least a portion of the third $C_1$ to $C_4$ gas stream, or combinations thereof are introduced to an acid gas scrubber to produce a treated $C_1$ to $C_4$ gas stream, wherein an amount of acid gases in the treated $C_1$ to $C_4$ gas stream is less than an amount of acid gases in the first $C_1$ to $C_4$ gas stream, the second $C_1$ to $C_4$ gas stream, the third $C_1$ to $C_4$ gas stream, or combinations thereof, respectively.

13. The process of claim 12, wherein at least a portion of the treated $C_1$ to $C_4$ gas stream is conveyed to the second separating unit.

14. The process of claim 1, wherein the $C_5$+ liquid hydrocarbons comprise heavy hydrocarbon molecules, wherein the hydrocarbon liquid stream comprises heavy hydrocarbon molecules, and wherein an amount of heavy hydrocarbon molecules in the first hydrocarbon product is less than an amount of heavy hydrocarbon molecules in the hydrocarbon liquid stream due to hydrocracking of at least a portion of heavy hydrocarbon molecules from the hydrocarbon liquid stream during the step (b) of contacting the hydrocarbon liquid stream with a first hydroprocessing catalyst.

15. The process of claim 1, wherein the amount of $C_6$ to $C_8$ aromatic hydrocarbons in the second hydrocarbon product is increased by equal to or greater than about 1 wt. %, when compared to the amount of $C_6$ to $C_8$ aromatic hydrocarbons in the first heavies stream, wherein the $C_9$+ hydrocarbons comprise $C_9$+ aromatic hydrocarbons, and wherein an increase in the amount $C_6$ to $C_8$ aromatic hydrocarbons is due to hydrodealkylating of at least a portion of $C_9$+ aromatic hydrocarbons from the first heavies stream during the step (d) of contacting the first heavies stream with a second hydroprocessing catalyst.

16. The process of claim 1, wherein an amount of $C_6$ to $C_8$ aromatic hydrocarbons in the aromatics stream is greater than an amount of $C_6$ to $C_8$ aromatic hydrocarbons in the second hydrocarbon product.

17. The process of claim 1, wherein a $C_9$+ hydrocarbons content of a combination of the olefin gas stream, saturated hydrocarbons gas stream, and aromatics stream is less than about 5 wt. %, based on the weight of the combination of the olefin gas stream, saturated hydrocarbons gas stream, and aromatics stream.

18. The process of claim 1, wherein the plastic waste comprises equal to or greater than about 400 ppmw polyvinylchloride and/or polyvinylidene chloride, based on the total weight of the plastic waste.

* * * * *